(12) United States Patent
Powell

(10) Patent No.: US 9,355,345 B2
(45) Date of Patent: May 31, 2016

(54) TRANSPARENT TAGS WITH ENCODED DATA

(75) Inventor: Karlton D. Powell, Lake Stevens, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 946 days.

(21) Appl. No.: 13/555,404

(22) Filed: Jul. 23, 2012

(65) Prior Publication Data

US 2014/0022629 A1    Jan. 23, 2014

(51) Int. Cl.
| | |
|---|---|
| *G06K 19/06* | (2006.01) |
| *G02B 5/20* | (2006.01) |
| *G02B 5/22* | (2006.01) |
| *G02B 5/26* | (2006.01) |
| *G02B 5/28* | (2006.01) |

(52) U.S. Cl.
CPC ............ *G06K 19/0614* (2013.01); *G02B 5/208* (2013.01); *G02B 5/22* (2013.01); *G02B 5/26* (2013.01); *G02B 5/281* (2013.01)

(58) Field of Classification Search
None
See application file for complete search history.

(56) References Cited

U.S. PATENT DOCUMENTS

| | | |
|---|---|---|
| 4,046,975 A | 9/1977 | Seeger, Jr. |
| 4,065,649 A | 12/1977 | Carter et al. |
| 4,239,338 A | 12/1980 | Borrelli et al. |
| 4,243,861 A | 1/1981 | Strandwitz |
| 4,302,648 A | 11/1981 | Sado et al. |
| 4,317,013 A | 2/1982 | Larson |
| 4,365,130 A | 12/1982 | Christensen |
| 4,492,829 A | 1/1985 | Rodrique |
| 4,527,021 A | 7/1985 | Morikawa et al. |
| 4,559,426 A | 12/1985 | Van Zeeland et al. |
| 4,576,436 A | 3/1986 | Daniel |
| 4,588,187 A | 5/1986 | Dell |
| 4,607,147 A | 8/1986 | Ono et al. |
| 4,615,579 A | 10/1986 | Whitehead |
| 4,651,133 A | 3/1987 | Ganesan et al. |
| 5,220,521 A | 6/1993 | Kikinis |
| 5,283,559 A | 2/1994 | Kalendra et al. |

(Continued)

FOREIGN PATENT DOCUMENTS

| | | |
|---|---|---|
| CN | 1352767 | 6/2002 |
| CN | 1440513 | 9/2003 |

(Continued)

OTHER PUBLICATIONS

"International Search Report and Written Opinion", Application No. PCT/US2013/051421, Dec. 6, 2013, 10 pages.

(Continued)

*Primary Examiner* — Derek S Chapel
(74) *Attorney, Agent, or Firm* — Brandon Roper; Judy Yee; Micky Minhas

(57) ABSTRACT

Transparent tags with encoded data include both a base mirror component and a matrix component, and may optionally include a filter component. These components are combined to achieve a system having a tag that absorbs infrared light in particular portions and reflects infrared light in other portions, presenting a pattern which encodes the data included in the tag to sensors of a display panel. This combination of components also reduces near infrared and/or red ambient light that can be sensed by the sensor in the display panel, reducing interference from such ambient light when identifying the pattern while enabling the tag to be substantially visibly transparent to a user.

20 Claims, 6 Drawing Sheets

(56) References Cited

U.S. PATENT DOCUMENTS

| | | |
|---|---|---|
| 5,331,443 A | 7/1994 | Stanisci |
| 5,339,382 A | 8/1994 | Whitehead |
| 5,406,415 A | 4/1995 | Kelly |
| 5,548,477 A | 8/1996 | Kumar et al. |
| 5,558,577 A | 9/1996 | Kato |
| 5,681,220 A | 10/1997 | Bertram et al. |
| 5,745,376 A | 4/1998 | Barker et al. |
| 5,748,114 A | 5/1998 | Koehn |
| 5,781,406 A | 7/1998 | Hunte |
| 5,807,175 A | 9/1998 | Davis et al. |
| 5,818,361 A | 10/1998 | Acevedo |
| 5,828,770 A | 10/1998 | Leis et al. |
| 5,861,990 A | 1/1999 | Tedesco |
| 5,874,697 A | 2/1999 | Selker et al. |
| 5,926,170 A | 7/1999 | Oba |
| 5,971,635 A | 10/1999 | Wise |
| 5,999,147 A | 12/1999 | Teitel |
| 6,002,389 A | 12/1999 | Kasser |
| 6,005,209 A | 12/1999 | Burleson et al. |
| 6,012,714 A | 1/2000 | Worley et al. |
| 6,040,823 A | 3/2000 | Seffernick et al. |
| 6,044,717 A | 4/2000 | Biegelsen et al. |
| 6,046,857 A | 4/2000 | Morishima et al. |
| 6,061,644 A | 5/2000 | Leis |
| 6,178,443 B1 | 1/2001 | Lin |
| 6,195,136 B1 | 2/2001 | Handschy et al. |
| 6,232,934 B1 | 5/2001 | Heacock et al. |
| 6,238,078 B1 | 5/2001 | Hed |
| 6,254,105 B1 | 7/2001 | Rinde et al. |
| 6,279,060 B1 | 8/2001 | Luke et al. |
| 6,300,986 B1 | 10/2001 | Travis |
| 6,329,617 B1 | 12/2001 | Burgess |
| 6,342,871 B1 | 1/2002 | Takeyama |
| 6,344,791 B1 | 2/2002 | Armstrong |
| 6,353,503 B1 | 3/2002 | Spitzer et al. |
| 6,362,861 B1 | 3/2002 | Hertz et al. |
| 6,380,497 B1 | 4/2002 | Hashimoto et al. |
| 6,437,682 B1 | 8/2002 | Vance |
| 6,469,755 B1 | 10/2002 | Adachi et al. |
| 6,511,378 B1 | 1/2003 | Bhatt et al. |
| 6,532,147 B1 | 3/2003 | Christ, Jr. |
| 6,543,949 B1 | 4/2003 | Ritchey et al. |
| 6,565,439 B2 | 5/2003 | Shinohara et al. |
| 6,600,121 B1 | 7/2003 | Olodort et al. |
| 6,603,408 B1 | 8/2003 | Gaba |
| 6,617,536 B2 | 9/2003 | Kawaguchi |
| 6,685,369 B2 | 2/2004 | Lien |
| 6,704,864 B1 | 3/2004 | Philyaw |
| 6,721,019 B2 | 4/2004 | Kono et al. |
| 6,725,318 B1 | 4/2004 | Sherman et al. |
| 6,774,888 B1 | 8/2004 | Genduso |
| 6,776,546 B2 | 8/2004 | Kraus et al. |
| 6,784,869 B1 | 8/2004 | Clark et al. |
| 6,795,146 B2 | 9/2004 | Dozov et al. |
| 6,813,143 B2 | 11/2004 | Makela |
| 6,819,316 B2 | 11/2004 | Schulz et al. |
| 6,833,955 B2 | 12/2004 | Niv |
| 6,847,488 B2 | 1/2005 | Travis |
| 6,856,506 B2 | 2/2005 | Doherty et al. |
| 6,861,961 B2 | 3/2005 | Sandbach et al. |
| 6,914,197 B2 | 7/2005 | Doherty et al. |
| 6,950,950 B2 | 9/2005 | Sawyers et al. |
| 6,970,957 B1 | 11/2005 | Oshins et al. |
| 6,976,799 B2 | 12/2005 | Kim et al. |
| 7,007,238 B2 | 2/2006 | Glaser |
| 7,025,908 B1 | 4/2006 | Hayashi et al. |
| 7,051,149 B2 | 5/2006 | Wang et al. |
| 7,058,252 B2 | 6/2006 | Woodgate et al. |
| 7,066,634 B2 | 6/2006 | Kitamura et al. |
| 7,091,436 B2 | 8/2006 | Serban |
| 7,101,048 B2 | 9/2006 | Travis |
| 7,106,222 B2 | 9/2006 | Ward et al. |
| 7,123,292 B1 | 10/2006 | Seeger et al. |
| 7,152,985 B2 | 12/2006 | Benitez et al. |
| 7,194,662 B2 | 3/2007 | Do et al. |
| 7,199,931 B2 | 4/2007 | Boettiger et al. |
| 7,213,991 B2 | 5/2007 | Chapman et al. |
| 7,218,830 B2 | 5/2007 | Iimura |
| 7,277,087 B2 | 10/2007 | Hill et al. |
| 7,400,805 B2 | 7/2008 | Abu-Ageel |
| 7,447,934 B2 | 11/2008 | Dasari et al. |
| 7,469,386 B2 | 12/2008 | Bear et al. |
| 7,499,037 B2 | 3/2009 | Lube |
| 7,499,216 B2 | 3/2009 | Niv et al. |
| 7,502,803 B2 | 3/2009 | Culter et al. |
| 7,515,143 B2 | 4/2009 | Keam et al. |
| 7,542,052 B2 | 6/2009 | Solomon et al. |
| 7,558,594 B2 | 7/2009 | Wilson |
| 7,559,834 B1 | 7/2009 | York |
| 7,561,131 B2 | 7/2009 | Ijzerman et al. |
| 7,636,921 B2 | 12/2009 | Louie |
| 7,643,213 B2 | 1/2010 | Boettiger et al. |
| 7,656,392 B2 | 2/2010 | Bolender |
| 7,733,326 B1 | 6/2010 | Adiseshan |
| 7,777,972 B1 | 8/2010 | Chen et al. |
| 7,782,342 B2 | 8/2010 | Koh |
| 7,800,708 B2 | 9/2010 | Brott et al. |
| 7,813,715 B2 | 10/2010 | McKillop et al. |
| 7,855,716 B2 | 12/2010 | McCreary et al. |
| 7,884,807 B2 | 2/2011 | Hovden et al. |
| D636,397 S | 4/2011 | Green |
| 7,918,559 B2 | 4/2011 | Tesar |
| 7,928,964 B2 | 4/2011 | Kolmykov-Zotov et al. |
| 7,945,717 B2 | 5/2011 | Rivalsi |
| 7,967,462 B2 | 6/2011 | Ogiro et al. |
| 7,973,771 B2 | 7/2011 | Geaghan |
| 7,978,281 B2 | 7/2011 | Vergith et al. |
| 8,035,614 B2 | 10/2011 | Bell et al. |
| 8,035,624 B2 | 10/2011 | Bell et al. |
| 8,053,688 B2 | 11/2011 | Conzola et al. |
| 8,065,624 B2 | 11/2011 | Morin et al. |
| 8,069,356 B2 | 11/2011 | Rathi et al. |
| RE42,992 E | 12/2011 | David |
| 8,102,362 B2 | 1/2012 | Ricks et al. |
| 8,115,718 B2 | 2/2012 | Chen et al. |
| 8,130,203 B2 | 3/2012 | Westerman |
| 8,154,524 B2 | 4/2012 | Wilson et al. |
| D659,139 S | 5/2012 | Gengler |
| 8,169,421 B2 | 5/2012 | Wright et al. |
| 8,220,929 B2 | 7/2012 | Miyawaki et al. |
| 8,229,509 B2 | 7/2012 | Paek et al. |
| 8,229,522 B2 | 7/2012 | Kim et al. |
| 8,243,027 B2 | 8/2012 | Hotelling et al. |
| 8,249,263 B2 | 8/2012 | Cragun |
| 8,310,768 B2 | 11/2012 | Lin et al. |
| 8,345,920 B2 | 1/2013 | Ferren et al. |
| 8,416,206 B2 | 4/2013 | Carpendale et al. |
| 8,466,902 B2 | 6/2013 | Boer et al. |
| 8,582,206 B2 | 11/2013 | Travis |
| 8,717,664 B2 | 5/2014 | Wang et al. |
| 8,749,529 B2 | 6/2014 | Powell et al. |
| 9,019,615 B2 | 4/2015 | Travis |
| 9,052,414 B2 | 6/2015 | Travis et al. |
| 9,152,173 B2 | 10/2015 | Lee et al. |
| 2002/0134828 A1 | 9/2002 | Sandbach et al. |
| 2003/0165017 A1 | 9/2003 | Amitai |
| 2003/0197687 A1 | 10/2003 | Shetter |
| 2004/0052506 A1 | 3/2004 | Togino |
| 2004/0174709 A1 | 9/2004 | Buelow, II et al. |
| 2004/0258924 A1 | 12/2004 | Berger et al. |
| 2004/0268000 A1 | 12/2004 | Barker et al. |
| 2005/0001957 A1 | 1/2005 | Amimori et al. |
| 2005/0002073 A1 | 1/2005 | Nakamura et al. |
| 2005/0057515 A1 | 3/2005 | Bathiche |
| 2005/0059489 A1 | 3/2005 | Kim |
| 2005/0084212 A1 | 4/2005 | Fein |
| 2005/0100690 A1 | 5/2005 | Mayer et al. |
| 2005/0146512 A1 | 7/2005 | Hill et al. |
| 2005/0264653 A1 | 12/2005 | Starkweather et al. |
| 2005/0264988 A1 | 12/2005 | Nicolosi |
| 2006/0002101 A1 | 1/2006 | Wheatley et al. |
| 2006/0028400 A1 | 2/2006 | Lapstun et al. |
| 2006/0085658 A1 | 4/2006 | Allen et al. |
| 2006/0125799 A1 | 6/2006 | Hillis et al. |

(56) References Cited

U.S. PATENT DOCUMENTS

| | | |
|---|---|---|
| 2006/0154725 A1 | 7/2006 | Glaser et al. |
| 2006/0156415 A1 | 7/2006 | Rubinstein et al. |
| 2006/0181514 A1 | 8/2006 | Newman |
| 2006/0195522 A1 | 8/2006 | Miyazaki |
| 2006/0227393 A1 | 10/2006 | Herloski |
| 2006/0238550 A1 | 10/2006 | Page |
| 2006/0239006 A1 | 10/2006 | Chaves et al. |
| 2006/0279501 A1 | 12/2006 | Lu et al. |
| 2007/0002587 A1 | 1/2007 | Miyashita |
| 2007/0047260 A1 | 3/2007 | Lee et al. |
| 2007/0062089 A1 | 3/2007 | Homer et al. |
| 2007/0072474 A1 | 3/2007 | Beasley et al. |
| 2007/0182663 A1 | 8/2007 | Biech |
| 2007/0189667 A1 | 8/2007 | Wakita et al. |
| 2007/0234420 A1 | 10/2007 | Novotney et al. |
| 2007/0236408 A1 | 10/2007 | Yamaguchi et al. |
| 2007/0247432 A1 | 10/2007 | Oakley |
| 2007/0260892 A1 | 11/2007 | Paul et al. |
| 2007/0279744 A1 | 12/2007 | Fujimoto |
| 2007/0283179 A1 | 12/2007 | Burnett et al. |
| 2008/0005423 A1 | 1/2008 | Jacobs et al. |
| 2008/0080166 A1 | 4/2008 | Duong et al. |
| 2008/0088593 A1 | 4/2008 | Smoot |
| 2008/0094398 A1 | 4/2008 | Ng et al. |
| 2008/0104437 A1 | 5/2008 | Lee |
| 2008/0122803 A1 | 5/2008 | Izadi et al. |
| 2008/0150913 A1 | 6/2008 | Bell et al. |
| 2008/0151478 A1 | 6/2008 | Chern |
| 2008/0158185 A1 | 7/2008 | Westerman |
| 2008/0179507 A2 | 7/2008 | Han |
| 2008/0225205 A1 | 9/2008 | Travis |
| 2008/0238871 A1 | 10/2008 | Tam |
| 2008/0238884 A1 | 10/2008 | Harish |
| 2008/0253822 A1 | 10/2008 | Matias |
| 2008/0316002 A1 | 12/2008 | Brunet et al. |
| 2008/0320190 A1 | 12/2008 | Lydon et al. |
| 2009/0009476 A1 | 1/2009 | Daley, III |
| 2009/0033623 A1 | 2/2009 | Lin |
| 2009/0067156 A1 | 3/2009 | Bonnett et al. |
| 2009/0073957 A1 | 3/2009 | Newland et al. |
| 2009/0096738 A1 | 4/2009 | Chen et al. |
| 2009/0140985 A1 | 6/2009 | Liu |
| 2009/0142020 A1 | 6/2009 | Van Ostrand et al. |
| 2009/0167718 A1 | 7/2009 | Lee et al. |
| 2009/0189974 A1 | 7/2009 | Deering |
| 2009/0200384 A1 | 8/2009 | Masalkar |
| 2009/0251008 A1 | 10/2009 | Sugaya |
| 2009/0262492 A1 | 10/2009 | Whitchurch et al. |
| 2009/0303204 A1 | 12/2009 | Nasiri et al. |
| 2009/0320244 A1 | 12/2009 | Lin |
| 2009/0321490 A1 | 12/2009 | Groene et al. |
| 2010/0001963 A1 | 1/2010 | Doray et al. |
| 2010/0026656 A1 | 2/2010 | Hotelling et al. |
| 2010/0038821 A1 | 2/2010 | Jenkins et al. |
| 2010/0045633 A1 | 2/2010 | Gettemy |
| 2010/0051432 A1 | 3/2010 | Lin et al. |
| 2010/0053534 A1 | 3/2010 | Hsieh et al. |
| 2010/0053771 A1 | 3/2010 | Travis et al. |
| 2010/0072351 A1 | 3/2010 | Mahowald |
| 2010/0077237 A1 | 3/2010 | Sawyers |
| 2010/0085321 A1 | 4/2010 | Pundsack |
| 2010/0102206 A1 | 4/2010 | Cazaux et al. |
| 2010/0103112 A1 | 4/2010 | Yoo et al. |
| 2010/0149073 A1 | 6/2010 | Chaum et al. |
| 2010/0149100 A1 | 6/2010 | Meiby |
| 2010/0149111 A1 | 6/2010 | Olien |
| 2010/0149117 A1 | 6/2010 | Chien et al. |
| 2010/0161522 A1 | 6/2010 | Tirpak et al. |
| 2010/0164857 A1 | 7/2010 | Liu et al. |
| 2010/0171891 A1 | 7/2010 | Kaji et al. |
| 2010/0174421 A1 | 7/2010 | Tsai et al. |
| 2010/0177388 A1 | 7/2010 | Cohen et al. |
| 2010/0180063 A1 | 7/2010 | Ananny et al. |
| 2010/0188299 A1 | 7/2010 | Rinehart et al. |
| 2010/0206614 A1 | 8/2010 | Park et al. |
| 2010/0214659 A1 | 8/2010 | Levola |
| 2010/0222110 A1 | 9/2010 | Kim et al. |
| 2010/0250988 A1 | 9/2010 | Okuda et al. |
| 2010/0274932 A1 | 10/2010 | Kose |
| 2010/0279768 A1 | 11/2010 | Huang et al. |
| 2010/0282953 A1 | 11/2010 | Tam |
| 2010/0284085 A1 | 11/2010 | Laakkonen |
| 2010/0289457 A1 | 11/2010 | Onnerud et al. |
| 2010/0295812 A1 | 11/2010 | Burns et al. |
| 2010/0296163 A1 | 11/2010 | Saarikko |
| 2010/0302378 A1 | 12/2010 | Marks et al. |
| 2010/0302469 A1 | 12/2010 | Yue et al. |
| 2010/0306538 A1 | 12/2010 | Thomas et al. |
| 2010/0308778 A1 | 12/2010 | Yamazaki et al. |
| 2010/0308844 A1 | 12/2010 | Day et al. |
| 2010/0315348 A1 | 12/2010 | Jellicoe et al. |
| 2010/0325155 A1 | 12/2010 | Skinner et al. |
| 2011/0002577 A1 | 1/2011 | Van Ostrand |
| 2011/0007047 A1 | 1/2011 | Fujioka et al. |
| 2011/0012873 A1 | 1/2011 | Prest et al. |
| 2011/0019123 A1 | 1/2011 | Prest et al. |
| 2011/0031287 A1 | 2/2011 | Le Gette et al. |
| 2011/0032215 A1 | 2/2011 | Sirotich et al. |
| 2011/0035209 A1 | 2/2011 | Macfarlane |
| 2011/0037721 A1 | 2/2011 | Cranfill et al. |
| 2011/0043479 A1 | 2/2011 | van Aerle et al. |
| 2011/0043990 A1 | 2/2011 | Mickey et al. |
| 2011/0044579 A1 | 2/2011 | Travis et al. |
| 2011/0060926 A1 | 3/2011 | Brooks et al. |
| 2011/0069148 A1 | 3/2011 | Jones et al. |
| 2011/0072391 A1 | 3/2011 | Hanggie et al. |
| 2011/0074688 A1 | 3/2011 | Hull et al. |
| 2011/0096035 A1 | 4/2011 | Shen |
| 2011/0102326 A1 | 5/2011 | Casparian et al. |
| 2011/0122071 A1 | 5/2011 | Powell |
| 2011/0134032 A1 | 6/2011 | Chiu et al. |
| 2011/0163955 A1 | 7/2011 | Nasiri et al. |
| 2011/0164370 A1 | 7/2011 | McClure et al. |
| 2011/0167181 A1 | 7/2011 | Minoo et al. |
| 2011/0167287 A1 | 7/2011 | Walsh et al. |
| 2011/0167391 A1 | 7/2011 | Momeyer et al. |
| 2011/0169778 A1 | 7/2011 | Nungester et al. |
| 2011/0170289 A1 | 7/2011 | Allen et al. |
| 2011/0179864 A1 | 7/2011 | Raasch et al. |
| 2011/0184646 A1 | 7/2011 | Wong et al. |
| 2011/0193787 A1 | 8/2011 | Morishige et al. |
| 2011/0197156 A1 | 8/2011 | Strait et al. |
| 2011/0205372 A1 | 8/2011 | Miramontes |
| 2011/0216039 A1 | 9/2011 | Chen et al. |
| 2011/0227913 A1 | 9/2011 | Hyndman |
| 2011/0234535 A1 | 9/2011 | Hung et al. |
| 2011/0235179 A1 | 9/2011 | Simmonds |
| 2011/0242440 A1 | 10/2011 | Noma et al. |
| 2011/0242670 A1 | 10/2011 | Simmonds |
| 2011/0248920 A1 | 10/2011 | Larsen |
| 2011/0290686 A1 | 12/2011 | Huang |
| 2011/0291993 A1 | 12/2011 | Miyazaki |
| 2011/0297566 A1 | 12/2011 | Gallagher et al. |
| 2011/0304577 A1 | 12/2011 | Brown |
| 2011/0304815 A1 | 12/2011 | Newell |
| 2011/0316807 A1 | 12/2011 | Corrion |
| 2011/0317399 A1 | 12/2011 | Hsu |
| 2012/0007821 A1 | 1/2012 | Zaliva |
| 2012/0023459 A1 | 1/2012 | Westerman |
| 2012/0024682 A1 | 2/2012 | Huang et al. |
| 2012/0044179 A1 | 2/2012 | Hudson |
| 2012/0047368 A1 | 2/2012 | Chinn et al. |
| 2012/0050975 A1 | 3/2012 | Garelli et al. |
| 2012/0062850 A1 | 3/2012 | Travis |
| 2012/0068919 A1 | 3/2012 | Lauder et al. |
| 2012/0075249 A1 | 3/2012 | Hoch |
| 2012/0075256 A1* | 3/2012 | Izadi et al. .............. 345/175 |
| 2012/0092279 A1 | 4/2012 | Martin |
| 2012/0094257 A1 | 4/2012 | Pillischer et al. |
| 2012/0098872 A1 | 4/2012 | Kim et al. |
| 2012/0099749 A1 | 4/2012 | Rubin et al. |
| 2012/0102436 A1 | 4/2012 | Nurmi |
| 2012/0102438 A1 | 4/2012 | Robinson et al. |
| 2012/0113031 A1 | 5/2012 | Lee et al. |

(56) References Cited

U.S. PATENT DOCUMENTS

| | | | |
|---|---|---|---|
| 2012/0113223 | A1 | 5/2012 | Hilliges et al. |
| 2012/0117409 | A1 | 5/2012 | Lee et al. |
| 2012/0127118 | A1 | 5/2012 | Nolting et al. |
| 2012/0140396 | A1 | 6/2012 | Zeliff et al. |
| 2012/0145525 | A1 | 6/2012 | Ishikawa |
| 2012/0146943 | A1 | 6/2012 | Fairley et al. |
| 2012/0162088 | A1 | 6/2012 | van Lieshout et al. |
| 2012/0162126 | A1 | 6/2012 | Yuan et al. |
| 2012/0162693 | A1 | 6/2012 | Ito |
| 2012/0170284 | A1 | 7/2012 | Shedletsky |
| 2012/0182242 | A1 | 7/2012 | Lindahl et al. |
| 2012/0182743 | A1 | 7/2012 | Chou |
| 2012/0188243 | A1 | 7/2012 | Fujii et al. |
| 2012/0194448 | A1 | 8/2012 | Rothkopf |
| 2012/0195063 | A1 | 8/2012 | Kim et al. |
| 2012/0200532 | A1 | 8/2012 | Powell et al. |
| 2012/0224073 | A1 | 9/2012 | Miyahara |
| 2012/0243102 | A1 | 9/2012 | Takeda et al. |
| 2012/0243204 | A1 | 9/2012 | Robinson |
| 2012/0246377 | A1 | 9/2012 | Bhesania |
| 2012/0256959 | A1 | 10/2012 | Ye et al. |
| 2012/0268912 | A1 | 10/2012 | Minami et al. |
| 2012/0274811 | A1 | 11/2012 | Bakin |
| 2012/0300275 | A1 | 11/2012 | Vilardell et al. |
| 2013/0027354 | A1 | 1/2013 | Yabuta et al. |
| 2013/0063873 | A1 | 3/2013 | Wodrich et al. |
| 2013/0106813 | A1 | 5/2013 | Hotelling et al. |
| 2013/0107572 | A1 | 5/2013 | Holman et al. |
| 2013/0120760 | A1 | 5/2013 | Raguin et al. |
| 2013/0181926 | A1 | 7/2013 | Lim |
| 2013/0201094 | A1 | 8/2013 | Travis |
| 2013/0207896 | A1 | 8/2013 | Robinson et al. |
| 2013/0222353 | A1 | 8/2013 | Large |
| 2013/0229357 | A1 | 9/2013 | Powell |
| 2013/0265220 | A1 | 10/2013 | Fleischmann et al. |
| 2013/0329301 | A1 | 12/2013 | Travis |
| 2013/0332628 | A1 | 12/2013 | Panay |
| 2014/0098085 | A1 | 4/2014 | Lee |
| 2014/0168131 | A1 | 6/2014 | Rihn |
| 2014/0233237 | A1 | 8/2014 | Lutian |
| 2014/0254032 | A1 | 9/2014 | Chen |
| 2015/0177497 | A1 | 6/2015 | Travis |

FOREIGN PATENT DOCUMENTS

| | | |
|---|---|---|
| CN | 102047155 | 5/2011 |
| CN | 102147643 | 8/2011 |
| EP | 0271956 | 6/1988 |
| EP | 2353978 | 8/2011 |
| EP | 2381290 | 10/2011 |
| JP | 10301055 | 11/1998 |
| JP | 10326124 | 12/1998 |
| JP | 2001174746 | 6/2001 |
| JP | 2009003053 | 1/2009 |
| JP | 2009122551 | 6/2009 |
| KR | 20110064265 | 6/2011 |
| WO | WO-9964784 | 12/1999 |
| WO | WO-0079327 | 12/2000 |
| WO | WO-2011016200 | 2/2011 |
| WO | WO 2012063410 | 5/2012 |

OTHER PUBLICATIONS

"International Search Report and Written Opinion", Application No. PCT/US2013/063156, Dec. 5, 2013, 9 pages.

"Non-Final Office Action", U.S. Appl. No. 13/409,967, Dec. 10, 2013, 5 pages.

"Non-Final Office Action", U.S. Appl. No. 13/408,257, Dec. 5, 2013, 13 pages.

"Notice of Allowance", U.S. Appl. No. 13/409,967, Feb. 14, 2014, 4 pages.

"Restriction Requirement", U.S. Appl. No. 13/494,722, Dec. 20, 2013, 6 pages.

"Final Office Action", U.S. Appl. No. 13/408,257, Dec. 10, 2014, 15 pages.

"Final Office Action", U.S. Appl. No. 13/492,232, Nov. 17, 2014, 13 pages.

"Final Office Action", U.S. Appl. No. 13/647,507, Oct. 27, 2014, 33 pages.

"Final Office Action", U.S. Appl. No. 13/714,401, Nov. 25, 2014, 15 pages.

"Final Office Action", U.S. Appl. No. 13/773,496, Nov. 4, 2014, 11 pages.

"Non-Final Office Action", U.S. Appl. No. 13/786,233, Nov. 20, 2014, 13 pages.

"Written Opinion", Application No. PCT/US2014/020050, Sep. 22, 2014, 6 Pages.

"Final Office Action", U.S. Appl. No. 13/408,257, Mar. 28, 2014, 17 pages.

"Foreign Office Action", CN Application No. 201320328022.1, Oct. 18, 2013, 3 Pages.

"Foreign Office Action", CN Application No. 201320328022.1, Feb. 17, 2014, 4 Pages.

"Restriction Requirement", U.S. Appl. No. 13/367,812, Mar. 11, 2014, 6 pages.

"Accessing Device Sensors", retrieved from <https://developer.palm.com/content/api/dev-guide/pdk/accessing-device-sensors.html> on May 25, 2012, 4 pages.

"ACPI Docking for Windows Operating Systems", Retrieved from: <http://www.scritube.com/limba/engleza/software/ACPI-Docking-for-Windows-Opera331824193.php> on Jul. 6, 2012, 10 pages.

"Cirago Slim Case®—Protective case with built-in kickstand for your iPhone 5®", Retrieved from <http://cirago.com/wordpress/wp-content/uploads/2012/10/ipc1500brochure1.pdf> on Jan. 29, 2013, (Jan. 2013), 1 page.

"First One Handed Fabric Keyboard with Bluetooth Wireless Technology", Retrieved from: <http://press.xtvworld.com/article3817.html> on May 8, 2012,(Jan. 6, 2005), 2 pages.

"For Any Kind of Proceeding 2011 Springtime as Well as Coil Nailers as Well as Hotter Summer Season", *Lady Shoe Worlds*, retrieved from <http://www.ladyshoesworld.com/2011/09/18/for-any-kind-of-proceeding-2011-springtime-as-well-as-coil-nailers-as-well-as-hotter-summer-season/> on Nov. 3, 2011,(Sep. 8, 2011), 2 pages.

"Force and Position Sensing Resistors: An Emerging Technology", *Interlink Electronics*, Available at <http://staff.science.uva.nl/~vlaander/docu/FSR/An_Exploring_Technology.pdf>,(Feb. 1990), pp. 1-6.

"Frogpad Introduces Weareable Fabric Keyboard with Bluetooth Technology", Retrieved from: <http://www.geekzone.co.nz/content.asp?contentid=3898> on May 7, 2012,(Jan. 7, 2005), 3 pages.

"Incipio LG G-Slate Premium Kickstand Case—Black Nylon", Retrieved from: <http://www.amazon.com/Incipio-G-Slate-Premium-Kickstand-Case/dp/B004ZKP916> on May 8, 2012, 4 pages.

"International Search Report PCT/US2011/050471, (Apr. 9, 2012), and Written Opinion", International Application Number PCT/US2011/050471, (Apr. 9, 2012), 8 pages.

"Membrane Keyboards & Membrane Keypads", Retrieved from: <http://www.pannam.com/> on May 9, 2012,(Mar. 4, 2009), 2 pages.

"Microsoft Develops Glasses-Free Eye-Tracking 3D Display", *Tech-FAQ*, retrieved from <http://www.tech-faq.com/microsoft-develops-glasses-free-eye-tracking-3d-display.html> on Nov. 2, 2011, 3 pages.

"Microsoft Reveals Futuristic 3D Virtual HoloDesk Patent", Retrieved from <http://www.patentbolt.com/2012/05/microsoft-reveals-futuristic-3d-virtual-holodesk-patent.htmlt> on May 28, 2012, (May 23, 2012), 9 pages.

"Motion Sensors", *Android Developers*, retrieved from <http://developer.android.com/guide/topics/sensors/sensors_motion.html> on May 25, 2012, 7 pages.

"Non-Final Office Action", U.S. Appl. No. 12/882,994, (Feb. 1, 2013), 17 pages.

"Non-Final Office Action", U.S. Appl. No. 13/471,001, (Feb. 19, 2013), 15 pages.

"Non-Final Office Action", U.S. Appl. No. 13/471,139, (Mar. 21, 2013), 12 pages.

"Non-Final Office Action", U.S. Appl. No. 13/471,202, (Feb. 11, 2013), 10 pages.

(56) References Cited

OTHER PUBLICATIONS

"Non-Final Office Action", U.S. Appl. No. 13/471,336, (Jan. 18, 2013), 14 pages.
"Non-Final Office Action", U.S. Appl. No. 13/651,195, (Jan. 2, 2013), 14 pages.
"Non-Final Office Action", U.S. Appl. No. 13/651,232, (Jan. 17, 2013), 15 pages.
"Non-Final Office Action", U.S. Appl. No. 13/651,272, (Feb. 12, 2013), 10 pages.
"Non-Final Office Action", U.S. Appl. No. 13/651,287, (Jan. 29, 2013), 13 pages.
"Non-Final Office Action", U.S. Appl. No. 13/651,304, (Mar. 22, 2013), 9 pages.
"Non-Final Office Action", U.S. Appl. No. 13/651,327, (Mar. 22, 2013), 6 pages.
"Non-Final Office Action", U.S. Appl. No. 13/651,871, (Mar. 18, 2013), 14 pages.
"Non-Final Office Action", U.S. Appl. No. 13/651,976, (Feb. 22, 2013), 16 pages.
"Non-Final Office Action", U.S. Appl. No. 13/653,321, (Feb. 1, 2013), 13 pages.
"Non-Final Office Action", U.S. Appl. No. 13/653,682, (Feb. 7, 2013), 11 pages.
"Notice of Allowance", U.S. Appl. No. 13/470,633, (Mar. 22, 2013), 7 pages.
"Position Sensors", *Android Developers*, retrieved from <http://developer.android.com/guide/topics/sensors/sensors_position.html> on May 25, 2012, 5 pages.
"Restriction Requirement", U.S. Appl. No. 13/471,139, (Jan. 17, 2013), 7 pages.
"Restriction Requirement", U.S. Appl. No. 13/651,304, (Jan. 18, 2013), 7 pages.
"Restriction Requirement", U.S. Appl. No. 13/651,726, (Feb. 22, 2013), 6 pages.
"Restriction Requirement", U.S. Appl. No. 13/651,871, (Feb. 7, 2013), 6 pages.
"SolRxTM E-Series Multidirectional Phototherapy ExpandableTM 2-Bulb Full Body Panel System", Retrieved from: <http://www.solarcsystems.com/us_multidirectional_uv_light_therapy_1_intro.html> on Jul. 25, 2012,(2011), 4 pages.
"The Microsoft Surface Tablets Comes With Impressive Design and Specs", Retrieved from <http://microsofttabletreview.com/the-microsoft-surface-tablets-comes-with-impressive-design-and-specs> on Jan. 30, 2013, (Jun. 2012), 2 pages.
"Tilt Shift Lenses: Perspective Control", retrieved from http://www.cambridgeincolour.com/tutorials/tilt-shift-lenses1.htm, (Mar. 28, 2008), 11 Pages.
"Virtualization Getting Started Guide", *Red Hat Enterprise Linux 6*, Edition 0.2, retrieved from <http://docs.redhat.com/docs/en-US/Red_Hat_Enterprise_Linux/6/html-single/Virtualization_Getting_Started_Guide/index.html> on Jun. 13, 2012, 24 pages.
"What is Active Alignment?", http://www.kasalis.com/active_alignment.html, retrieved on Nov. 22, 2012, 2 Pages.
Bert, et al., "Passive Matrix Addressing of Electrophoretic Image Display", *Conference on International Display Research Conference*, Retrieved from <http://www.cmst.be/publi/eurodisplay2002_s14-1.pdf>, (Oct. 1, 2002), 4 pages.
Block, Steve et al., "DeviceOrientation Event Specification", *W3C, Editor's Draft*, retrieved from <https://developer.palm.com/content/api/dev-guide/pdk/accessing-device-sensors.html> on May 25, 2012,(Jul. 12, 2011), 14 pages.
Brown, Rich "Microsoft Shows Off Pressure-Sensitive Keyboard", retrieved from <http://news.cnet.com/8301-17938_105-10304792-1.html> on May 7, 2012, (Aug. 6, 2009), 2 pages.
Burge, et al., "Determination of off-axis aberrations of imaging systems using on-axis measurements", *SPIE Proceeding*, Retrieved from <http://www.loft.optics.arizona.edu/documents/journal_articles/Jim_Burge_Determination_of_off-axis_aberrations_of_imaging_systems_using_on-axis_measurements.pdf>,(Sep. 21, 2011), 10 pages.

Butler, Alex et al., "SideSight: Multi-"touch" Interaction around Small Devices", *In the proceedings of the 21st annual ACM symposium on USer interface software and technology.*, retrieved from <http://research.microsoft.com/pubs/132534/sidesight_crv3.pdf> on May 29, 2012,(Oct. 19, 2008), 4 pages.
Chang, Jee-Gong et al., "Optical Design and Analysis of LCD Backlight Units Using ASAP", *Optical Engineering*, Available at <http://www.opticsvalley.com/resources/kbasePDF/ma_oe_001_optical_design.pdf>,(Jun. 2003), 15 pages.
Crider, Michael "Sony Slate Concept Tablet "Grows" a Kickstand", Retrieved from: <http://androidcommunity.com/sony-slate-concept-tablet-grows-a-kickstand-20120116/> on May 4, 2012,(Jan. 16, 2012), 9 pages.
Dietz, Paul H., et al., "A Practical Pressure Sensitive Computer Keyboard", In Proceedings of UIST 2009,(Oct. 2009), 4 pages.
Diverdi, et al., "An Immaterial Pseudo-3D Display with 3D Interaction", *In the proceedings of Three-Dimentional Television: Capture, Transmission, and Display, Springer*, Retrieved from <http://www.cs.ucsb.edu/~holl/pubs/DiVerdi-2007-3DTV.pdf>,(Feb. 6, 2007), 26 pages.
Glatt, Jeff "Channel and Key Pressure (Aftertouch).", Retrieved from: <http://home.roadrunner.com/~jgglatt/tutr/touch.htm> on Jun. 11, 2012, 2 pages.
Grossman, et al., "Multi-Finger Gestural Interaction with 3D Volumetric Displays", *In the proceedings of the 17th annual ACM symposium on User interface software and Technology*, Retrieved from <http://www.dgp.toronto.edu/papers/tgrossman_UIST2004.pdf>,(Oct. 24, 2004), pp. 61-70.
Hanlon, Mike "ElekTex Smart Fabric Keyboard Goes Wireless", Retrieved from: <http://www.gizmag.com/go/5048/> on May 7, 2012,(Jan. 15, 2006), 5 pages.
Kaur, Sukhmani "Vincent Liew's redesigned laptop satisfies ergonomic needs", Retrieved from: <http://www.designbuzz.com/entry/vincent-liew-s-redesigned-laptop-satisfies-ergonomic-needs/> on Jul. 27, 2012,(Jun. 21, 2010), 4 pages.
Khuntontong, Puttachat et al., "Fabrication of Molded Interconnection Devices by Ultrasonic Hot Embossing on Thin Polymer Films", IEEE Transactions on Electronics Packaging Manufacturing, vol. 32, No. 3,(Jul. 2009), pp. 152-156.
Lee, C.M.G "Flat-Panel Autostereoscopic 3D Display", *Optoelectric, IET*, Available at <http://ieeexplore.ieee.org/stamp.jsp?arnumber=04455550>,(Feb. 2008), pp. 24-28.
Lee, et al., "Depth-Fused 3D Imagery on an Immaterial Display", *In the proceedings of IEEE Transactions on Visualization and Computer Graphics*, vol. 15, No. 1, Retrieved from <http://ieeexplore.ieee.org/stamp/stamp.jsp?arnumber=04540094>,(Jan. 2009), pp. 20-33.
Lee, et al., "LED Light Coupler Design for a Ultra Thin Light Guide", *Journal of the Optical Society of Korea*, vol. 11, Issue.3, Retrieved from <http://opticslab.kongju.ac.kr/pdf/06.pdf>,(Sep. 2007), 5 pages.
Linderholm, Owen "Logitech Shows Cloth Keyboard for PDAs", Retrieved from: <http://www.pcworld.com/article/89084/logitech_shows_cloth_keyboard_for_pdas.html> on May 7, 2012,(Mar. 15, 2002), 5 pages.
Liu, et al., "Three-dimensional PC: toward novel forms of human-computer interaction", *In the proceedings of Three-Dimensional Video and Display: Devices and Systems* vol. CR76, Retrieved from <http://www.google.co.in/url?sa=t&rct=j&q=Three-dimensional+PC:+toward+novel+forms+of+human-computer+interaction&source=web&cd=1&ved=0CFoQFjAA&url=http%3A%2F%2Fciteseerx.ist.psu.edu%2Fviewdoc%2Fdownload%3Fdoi%3D10.1.1.32.9469%26rep%3Drep1%26,(Nov. 5, 2000), pp. 250-281.
McLellan, Charles "Eleksen Wireless Fabric Keyboard: a first look", Retrieved from: <http://www.zdnetasia.com/eleksen-wireless-fabric-keyboard-a-first-look-40278954.htm> on May 7, 2012,(Jul. 17, 2006), 9 pages.
Peli, Eli "Visual and Optometric Issues with Head-Mounted Displays", *IS & T/OSA Optics & Imaging in the Information Age, The Society for Imaging Science and Technology*, available at <http://www.u.arizona.edu/~zrui3/zhang_pHMPD_spie07.pdf>,(1996), pp. 364-369.

(56) References Cited

OTHER PUBLICATIONS

Post, E.R. et al., "E-Broidery: Design and Fabrication of Textile-Based Computing", IBM Systems Journal, vol. 39, Issue 3 & 4,(Jul. 2000), pp. 840-860
Purcher, Jack "Apple is Paving the Way for a New 3D GUI for IOS Devices", Retrieved from: <http://www.patentlyapple.com/patently-apple/2012/01/apple-is-paving-the-way-for-a-new-3d-gui-for-ios-devices.html> on Jun. 4, 2012,(Jan. 12, 2012),15 pages.
Reisman, et al., "A Screen-Space Formulation for 2D and 3D Direct Manipulation", *In the proceedings of the 22nd annual ACM symposium on User interface*, Retrieved from <http://innovis.cpsc.ucalgary.ca/innovis/uploads/Courses/TableTopDetails2009/Reisman2009.pdf>,(Oct. 4, 2009), pp. 69-78.
Schoning, Johannes et al., "Building Interactive Multi-Touch Surfaces", *Journal of Graphics, GPU, and Game Tools*, vol. 14, No. 3, available at <http://www.libavg.com/raw-attachment/wiki/Multitouch/Multitouchguide_draft.pdf>,(Nov. 2009), pp. 35-55.
Takamatsu, Seiichi et al., "Flexible Fabric Keyboard with Conductive Polymer-Coated Fibers", In Proceedings of Sensors 2011,(Oct. 28, 2011), 4 pages.
Travis, Adrian R., et al., "Flat Projection for 3-D", *In Proceedings of the IEEE*, vol. 94 Issue: 3, Available at <http://ieeexplore.ieee.org/stamp/stamp.jsp?tp=&arnumber=1605201>,(Mar. 2006), pp. 539-549.
Yan, Jin-Ren et al., "Edge-Lighting Light Guide Plate Based on Micro-Prism for Liquid Crystal Display", *Journal of Display Technology*, vol. 5, No. 9, Available at <http://ieeexplore.ieee.org/ielx5/9425/5196834/05196835.pdf?tp=&arnumber=5196835&isnumber=5196834>,(Sep. 2009), pp. 355-357.
Yu, et al., "A New Driving Scheme for Reflective Bistable Cholesteric Liquid Crystal Displays", *Society for Information Display International Symposium Digest of Technical Papers*, Retrieved from <http://www.ee.ust.hk/~eekwok/publications/1997/bcd_sid.pdf>,(May 1997), 4 pages.
Zhang, et al., "Model-Based Development of Dynamically Adaptive Software", *In Proceedings of ICSE 2006*, Available at <http://www.irisa.fr/lande/lande/icse-proceedings/icse/p371.pdf>,(May 20, 2006), pp. 371-380.
Zhang, Rui "Design of Head Mounted Displays", Retrieved at <<http://www.optics.arizona.edu/optomech/student%20reports/2007/Design%20of%20mounteddisplays%20Zhang.pdf>>, (Dec. 12, 2007), 6 pages.
"International Search Report and Written Opinion", Application No. PCT/US2014/020050, May 9, 2014, 10 pages.
"International Search Report and Written Opinion", Application No. PCT/US2014/016654, May 16, 2014, 11 pages.
"International Search Report and Written Opinion", Application No. PCT/US2013/075180, May 6, 2014, 12 pages.
"Non-Final Office Action", Application No. 13/408,257, Jul. 02, 2014, 20 pages.
"Non-Final Office Action", Application No. 13/492,232, Apr. 30, 2014, 9 pages.
"Non-Final Office Action", Application No. 13/494,722, May 09, 2014, 8 pages.
"Non-Final Office Action", Application No. 13/647,507, Jun. 19, 2014, 22 pages.
"Non-Final Office Action", Application No. 13/773,496, Jun. 23, 2014, 10 pages.
"Advisory Action", U.S. Appl. No. 13/408,257, Apr. 8, 2015, 9 pages.
"Final Office Action", U.S. Appl. No. 13/786,233, May 27, 2015, 14 pages.
"Foreign Office Action", CN Application No. 201310225788.1, Jun. 23, 2015, 14 Pages.
"Non-Final Office Action", U.S. Appl. No. 13/714,401, Apr. 17, 2015, 14 pages.
"Non-Final Office Action", U.S. Appl. No. 13/773,496, Jun. 8, 2015, 16 pages.
"Notice of Allowance", U.S. Appl. No. 13/647,507, Jun. 3, 2015, 7 pages.
"Supplemental Notice of Allowance", U.S. Appl. No. 13/647,507, Jun. 30, 2015, 2 pages.
Izadi, et al., "ThinSight: A Thin Form-Factor Interactive Surface Technology", Retrieved at <<http://research.microsoft.com/pubs/132532/p90-izadi.pdf>> Dec. 2012, pp. 90-98.
"PCT Search Report and Written Opinion", Application No. PCT/US2013/028479, (Jun. 17, 2013), 10 pages.
"PCT Search Report", Application No. PCT/US2013/042790, (Aug. 8, 2013), 9 pages.
"Notice of Allowance", U.S. Appl. No. 12/882,994, (Jul. 12, 2013), 9 pages.
"Chinese Search Report", Application No. 201110272868.3, (Apr. 1, 2013), 10 pages.
"Non-Final Office Action", U.S. Appl. No. 13/367,812, Sep. 18, 2014, 10 pages.
"Non-Final Office Action", U.S. Appl. No. 13/714,401, Jul. 8, 2014, 11 pages.
"International Search Report and Written Opinion", Application No. PCT/US2013/042550, (Sep. 24, 2013), 14 pages.
"Welcome to Windows 7", Retrieved from: <http://www.microsoft.com/en-us/download/confirmation.aspx?id=4984> on Aug. 1, 2013, (Sep. 16, 2009), 3 pages.
Prospero, Michael "Samsung Outs Series 5 Hybrid PC Tablet", Retrieved from: <http://blog.laptopmag.com/samsung-outs-series-5-hybrid-pc-tablet-running-windows-8> on Oct. 31, 2013, (Jun. 4, 2012), 7 pages.
"Non-Final Office Action", U.S. Appl. No. 13/492,232, Feb. 24, 2015, 12 pages.
"Non-Final Office Action", U.S. Appl. No. 13/647,507, Feb. 9, 2015, 37 pages.
"Notice of Allowance", U.S. Appl. No. 13/494,722, Dec. 18, 2014, 7 pages.
"Notice of Allowance", U.S. Appl. No. 13/367,812, Jan. 30, 2015, 8 pages.
"Examiner's Answer to Appeal Brief", U.S. Appl. No. 13/408,257, Nov. 6, 2015, 23 pages.
"Final Office Action", U.S. Appl. No. 13/492,232, Jul. 10, 2015, 11 pages.
"Final Office Action", U.S. Appl. No. 13/714,401, Aug. 4, 2015, 15 pages.
"Final Office Action", U.S. Appl. No. 13/773,496, Oct. 29, 2015, 16 pages.
"Non-Final Office Action", U.S. Appl. No. 13/786,233, Sep. 29, 2015, 10 pages.
"Supplemental Notice of Allowance", U.S. Appl. No. 13/647,507, Jul. 16, 2015, 2 pages.
"Supplemental Notice of Allowance", U.S. Appl. No. 13/647,507, Aug. 27, 2015, 2 pages.
Non-Final Office Action, U.S. Appl. No. 13/492,232, Dec. 17, 2015, 11 pages.
Non-Final Office Action, U.S. Appl. No. 13/714,401, Dec. 3, 2015, 16 pages.
Foreign Office Action, CN Application No. 201380030964.4, Feb. 14, 2016, 11 pages.
Foreign Office Action, CN Application No. 201310225788.1, Feb. 29, 2016, 11 Pages.

\* cited by examiner

TRANSPARENT TAGS WITH ENCODED DATA

BACKGROUND

Some display systems operate as interactive screens by incorporating sensors (sensing pixels), allowing objects (e.g., user's fingers, pens, and/or devices) that touch or come close to a portion of the screen to be sensed. The sensors detect such objects by relying on feedback from the interacting object in the infrared spectrum. While these systems can be very easy for users to interact with, they are not without their problems. One such problem is that the sensors in the display systems oftentimes are responsive to at least some wavelengths of light in addition to the infrared spectrum, making it difficult for the sensors to accurately sense objects. Another problem is that while opaque tags may be less susceptible to ambient noise, it is not possible to see through such tags as they typically block display information, allow code to be visible to the user, detract from the transparency of certain objects on which the tag is affixed, and so forth.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a transparent tag includes a first layer, a second layer, and a third layer. The first layer implements a base mirror component that reflects at least infrared light wavelengths. The second layer is situated on one side of the first layer and has one or more portions that absorb at least infrared wavelengths of light. The second layer implements a matrix component, with the portions that absorb infrared wavelengths of light and other portions through which infrared wavelengths of light are reflected encoding data. The third layer implements a filter component that absorbs one or more particular wavelengths of light, and is situated on an additional side of the first layer that is opposite the one side.

In accordance with one or more aspects, a transparent tag is configured to present, to a sensor-in-pixel display panel, data encoded in a pattern included in the transparent tag. The data is presented both by reflecting, from some portions of the transparent tag, to the sensor-in-pixel display panel infrared light received from the sensor-in-pixel display panel, and also by absorbing infrared light by other portions of the transparent tag. The transparent tag also reduces near infrared and/or red ambient light passing through the transparent tag to the sensor-in-pixel display panel.

BRIEF DESCRIPTION OF THE DRAWINGS

The same numbers are used throughout the drawings to reference like features.

DETAILED DESCRIPTION

Transparent tags with encoded data are discussed herein. A transparent tag includes both a base mirror component and a matrix component. A filter component may optionally be included in the transparent tag and/or a display panel. These components are combined to achieve a system having a tag that absorbs infrared light in particular portions and reflects infrared light in other portions, presenting a pattern included in the tag to sensors of a display panel. This combination of components also reduces near infrared and/or red ambient light that can be sensed by the sensors of the display panel, reducing interference from such ambient light when identifying the pattern.

Figure 1:
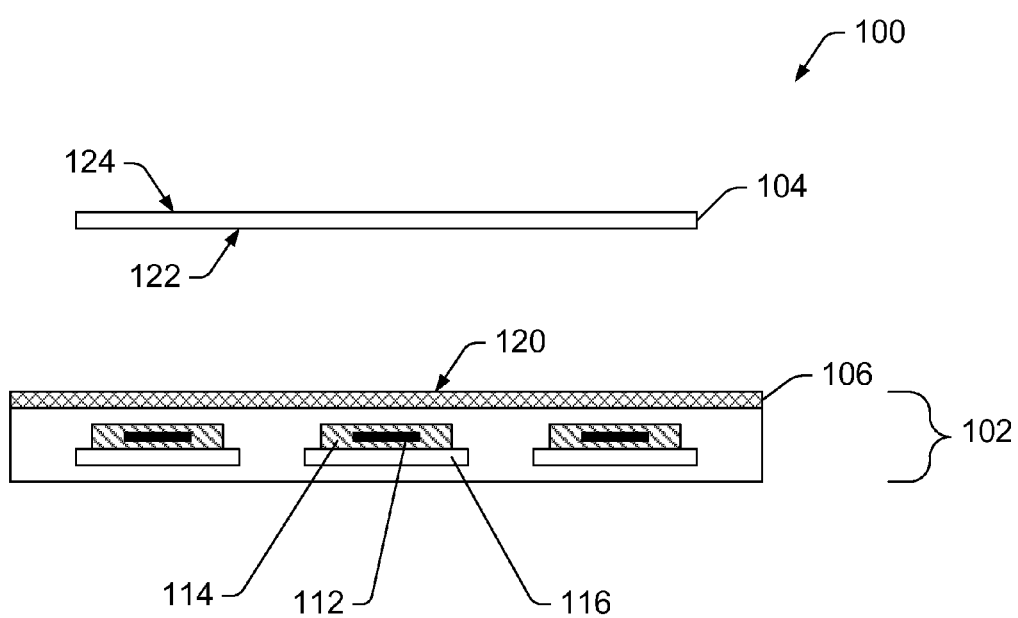
FIG. 1 illustrates an example system implementing the transparent tags with encoded data in accordance with one or more embodiments.

FIG. 1 illustrates an example system 100 implementing the transparent tags with encoded data in accordance with one or more embodiments. System 100 includes a display panel 102 and tag 104. Display panel 102 allows various data, user interfaces, and so forth to be displayed to users of system 100, and also allows various objects touching or close to display panel 102 to be detected. Tag 104 is a transparent tag that is transparent to the user of system 100, but that encodes data that can be detected by display panel 102.

Various different wavelengths of light are discussed herein, including: visible wavelengths (also referred to as visible light); red wavelengths (also referred to as red light), which are part of the visible wavelengths; near infrared (NIR) wavelengths (also referred to as near infrared light); and infrared (IR) wavelengths (also referred to as infrared light). The visible wavelengths typically range from approximately 400 nanometers (nm) to approximately 680 nm. The red wavelengths typically range from approximately 610 nm to 680 nm. The near infrared wavelengths typically range from approximately 680 nm to 810 nm. The infrared wavelengths typically range from approximately 810 nm to 890 nm (peaking at approximately 850 nm).

Although visible, red, near infrared, and infrared wavelengths are discussed herein, the techniques discussed herein can be used analogously with other wavelengths. For example, the discussions herein referring to red light being absorbed or reflected can analogously apply to other colors as well (e.g., orange, yellow, etc.).

Display panel 102 can be implemented using any of a variety of different techniques. For example, display panel 102 can be a liquid crystal (LCD) display panel, a light-emitting diode (LED) display panel, an organic light-emitting diode (OLED) display panel, a plasma display panel, a flexible display panel, a transparent display panel, a rear projection-based display screen, and so forth. It is to be appreciated that display panel 102 can include various different layers, the quantity and composition of which are dependent on the technique used to implement display panel 102. Display panel 102 can optionally include a cover panel 106 that is designed to protect display panel 102, and that is typically separate from (but can be affixed to) display panel 102. Display panel 102 supports touch inputs, allowing an object touching (or within a threshold distance of) a display surface of display panel 102 to be detected, as well as optionally the motion of such an object (e.g., a gesture made by a user).

In one or more embodiments, touch input detection is accomplished by incorporating image sensor elements into display panel 102 in a sensor-in-pixel configuration. In a sensor-in-pixel configuration, also referred to as an in-cell configuration, image sensor elements are positioned in one or more display pixels. Image sensor elements can be included in each display pixel, or alternatively a subset of display pixels. In display system 100, sensor elements 112 (also referred to as simply sensors) are positioned within display pixels 114 of display panel 102. Sensor elements 112 can be implemented in various manners, such as using Silicon-germanium sensors, infrared sensors, and so forth. Display panel 102 can also optionally include light blocking layers 116 configured to block display light from a back (or bottom) side of sensor elements 112. Touch input detection can detect various items or objects, such as a finger, a pen, a stylus, a tag (e.g., tag barcode or QR tag), and so forth touching and/or close to (e.g., within a threshold distance of) a display surface 120 of display panel 102. Alternatively, rather than a sensor-in-pixel configuration, display panel 102 can be implemented in other manners, such as using one or more infrared cameras in the display panel, one or more infrared cameras below the display panel, and so forth.

Various aspects of display panel 102 are discussed with reference to a top and a bottom. The top refers to the direction or position closer to display surface 120, and the bottom refers to the direction or position further from display surface 120. For example, the bottom of display pixel 114 is adjacent to the top of blocking layer 116.

In one or more embodiments, system 100 includes a reflective surface at the bottom of or below display panel 102. This reflective surface can be included as part of display panel 102 or separate from display panel 102. This reflective surface allows visible light to be reflected to assist a user in viewing images produced by display panel 102. Alternatively, system 100 can include one or more visible light sources to assist a user in view images produced by display panel 102, such as a light source (e.g., LEDs) below display panel 102 emitting light in visible wavelengths, a light source (e.g., LEDs) along one or more sides of display panel 102 emitting light in visible wavelengths, and so forth. Backlit illumination of system 100 can be achieved using such light sources in the form of an array of sources or arrays of sources coupled into a light guide plate (LGP) which can deliver the light to the back side of display panel 102. Alternatively, light may be delivered through a front light guide (e.g., positioned above display panel 102) and optionally using a reflective or transflective LCD display.

Display system 100 also includes one or more infrared light sources that emit light in infrared wavelengths. This infrared light is emitted towards display surface 120, and can be reflected by an object touching or within a threshold distance of display surface 120. This reflected infrared light is sensed by one or more sensor elements 112. The infrared light sources can be LEDs or other infrared light generating components. The infrared light sources can be located below display panel 102, or alternatively the infrared light sources can be situated in other locations, such as along one or more sides of display panel 102 (e.g., being delivered via an LGP), above display panel 102 (as a front light illumination), within display panel 102, and so forth. For front light illumination, the infrared light sources can be designed so as to illuminate only (or predominately) biased toward the user. Such infrared front light can be implemented in various manners, such as by using a dichroic visible-and-low-angle-infrared-transmit/high-angle-infrared-reflect reflector layer placed below a total internal reflection (TIR)-escape "leaky" light guide type illuminator LGP (light guiding panel).

An object being within a threshold distance of display surface 120 refers to the object being close enough to display surface 120 for infrared light to be reflected by the object and sensed by one or more sensor elements 112. This threshold distance can vary based on various factors, such as the intensity of the infrared light emitted by the infrared light sources, the angular character of the infrared light, the sensitivity of the sensor elements 112, the number of layers or panels of display panel 102 that the infrared light passes through, the spatial periodicity of the sensor array, the z distance from the sensor array plane to the object, the object size and spatial frequency content of object desired to be imaged, and so forth. For example, the threshold distance may be on the order of 1-10 millimeters, although can alternatively be other distances.

It should further be noted that, depending on the location of infrared light sources, light blocking layers 116 may not be included in display panel 102. For example, if the infrared light source is below display panel 102, then display panel 102 typically includes light blocking layers 116 to block the infrared light provided by the infrared light sources (but still detect infrared light reflected by an object touching or within a threshold distance of display surface 120). By way of another example, if the infrared light source is along one or more sides of display panel 102 (or above display panel 102) and direct infrared light provided by the infrared light sources is not directed towards sensor elements 112, then light blocking layers 116 may not be included in display panel 102.

Although sensor elements 112 detect infrared light, sensor elements 112 oftentimes detect light beyond the infrared wavelengths. For example, sensor elements 112 may detect light between 590 nm and 870 nm.

In some of the discussions herein, tag 104 is discussed with reference to being used in conjunction with a display panel 102 having a sensor-in-pixel configuration. Alternatively, display panel 102 can be implemented in different manners, having different types of configurations. For example, rather than sensor elements 112 being included in display pixels 114, one or more sensor elements (or cameras or other imaging devices) can be positioned below display pixels 114, can be positioned around the edge or perimeter of display panel 102, and so forth.

Tag 104 is a transparent tag. Tag 104 being transparent refers to a user being able to see through the tag (the tag is not opaque). In some situations tag 104 may be clear (have no color visible) to the human eye, and in other situations tag 104 may have a particular tint (a particular hue or some coloration) visible to the human eye. Even though the tag may have a particular tint, the tag can still be seen through by the user. Tag 104 can be incorporated into an object, or can be affixed to an object. For example, tag 104 can be separate from an object and affixed to the object via an adhesive.

Tag 104 includes data encoded using infrared absorbing material (e.g., a dye or ink). Although the encoded data is not visible to a user of system 100, the encoded data can be detected via sensor elements 112 of display panel 102. Thus, tag 104 allows a tag that encodes data that can be sensed or detected by display panel 102 but remains transparent to the user.

Tag 104 can include any of a variety of different data encoded using an infrared absorbing material (also referred to as encoded data). In one or more embodiments, tag 104 includes encoded data that is an identifier (ID) of an object. Tag 104 including an ID of a particular object can be included in (or affixed to) the particular object and the ID of that object can be readily detected by display panel 102 (or by another device or component from the encoded data sensed by display panel 102). The ID of the object can identify a particular individual object (e.g., a particular user's camera or phone, a particular game system, etc.), a particular class or type of object (e.g., a particular type of game controller, a particular model of camera, etc.), and so forth. Various other encoded data can also be included in a tag 104, in addition to or in place of the ID of the object. For example, the encoded data can include characteristics of the object (e.g., communication protocols supported by the object, magnification or other visual modification characteristics of the object, etc.), an indication of the manufacturer of the object, a date or version associated with the object, and so forth.

The data is encoded using a two-dimensional pattern. This two-dimensional pattern can use squares or other geometric shapes (e.g., dots or other circular shapes, triangles, lines, any other regular or irregular shapes, any combination of geometric shapes such as a dot shape resulting from intersection of circular area with a triangle, etc.). It should be noted that although the discussions herein refer to sensors 112 detecting the same wavelengths of light, alternatively different sensors may detect different wavelengths of light. For example, different sensors may detect different parts of the infrared spectrum. In such situations, in addition to or in place of the two-dimensional pattern, data can be encoded using a color-based pattern in which different colors (different ranges of wavelengths of light) represent different values. For example, light reflected in one range of wavelengths may represent a value of "0", while light reflected in another range of wavelengths may represent a value of "1".

Figure 2:
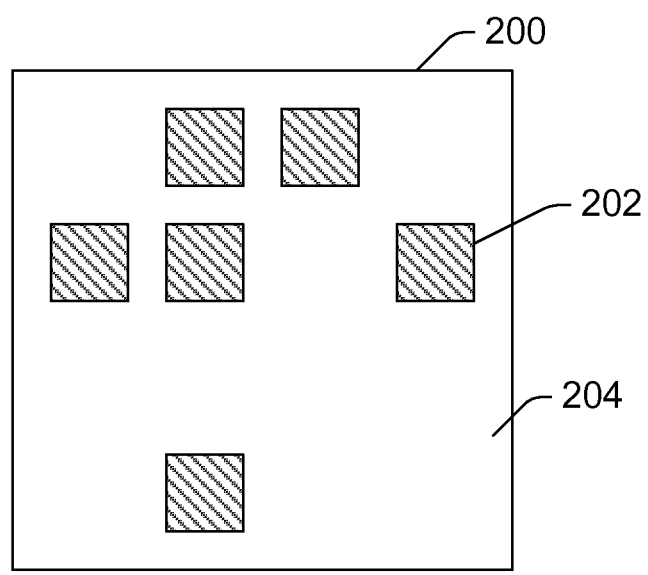
FIG. 2 illustrates an example of a tag with a pattern encoding data in accordance with one or more embodiments.

FIG. 2 illustrates an example of a tag 200 with a pattern encoding data in accordance with one or more embodiments. Tag 200 includes portions 202 configured to absorb or otherwise not reflect particular wavelengths of light. FIG. 2 illustrates a bottom view of tag 200, which is the view sensors (e.g., sensors 112 of FIG. 1) would have of tag 200. These portions 202 are illustrated with cross-hatching in FIG. 2. Tag 200 also includes portions 204 that are configured to reflect (or otherwise not absorb) those particular wavelengths of light. These portions 204 are illustrated without cross-hatching in FIG. 2. Note that the reflective portion may be within or outside of the various geometric shapes used as the feature, and thus be positive or negative. In one or more embodiments, the encircled island regions are reflective and the encapsulating regions are absorbing. Note also that island regions may further be contiguous, or touching in some cases, depending on code detection strategy and desired MTF (Modulation Transfer Function) at key points across coded pattern.

Thus, tag 200 includes some portions that absorb particular wavelengths of light, and other portions that do not absorb those particular wavelengths of light. When tag 200 is illuminated with those particular wavelengths of light, sensors (e.g., sensors 112 of FIG. 1) can detect which portions of tag 200 absorbed the light and which portions of tag 200 reflected the light. Based on these detected portions, an image of the tag that includes the pattern on tag 200 can be readily identified. This pattern can encode various data. Encoding as a positive ID mask, for example, tag 200 may include a 4×4 matrix of square locations, the presence of a square (e.g., light, not being absorbed by dye or filter, thus being reflected by tag 200) at a particular location can be a positive intensity, signal, or grey bit-level in the resulting image to indicate, through software filtering, a value of "1" for that location or part of pattern code, and the absence of a square (e.g., light being absorbed by tag 200) at a particular location can be a low intensity, signal, or grey bit-level in the resulting image to indicate, through software filtering, a value of "0" for the location. Alternatively, the pattern code may be a negative mask, such that the presence of a square, which produces a negative image (e.g., light being exposed to filter or dye within the square, thus being absorbed by tag 200) at a particular location can be a low intensity, signal, or grey bit-level in the resulting image to indicate, through software filtering, a value of "1" for that location, and the absence of a square (e.g., light being reflected by tag 200) at a particular location can be a positive intensity, signal, or grey bit-level in the resulting image to indicate a value of "0" for the location. Thus, using a 4×4 matrix, a 16-bit value can be encoded in the pattern of tag 200. The location of the 4×4 matrix can be identified in different manners, such as using guide points or markers detectable by the sensors, the tag including the 4×4 matrix being placed (e.g., by a user) on or close to a particular portion of the display panel, and so forth. Although a 4×4 matrix of square locations is discussed, it should be noted that the pattern can use various shapes (or combinations of shapes) as discussed above, and can include any number of locations allowing values of various sizes to be encoded in the pattern.

The pattern in tag 200 can be interpreted as a black and white pattern, although the portions do not actually have black and white colors as viewed by the human eye. The areas of tag 200 that absorb the particular wavelengths of light can be interpreted as the black portion of the pattern, and the areas of tag 200 that reflect the particular wavelengths of light can be interpreted as the white portion of the pattern.

Returning to FIG. 1, tag 104 incorporates both a base mirror component and a matrix component, and may optionally incorporate a filter component. Generally, these components are combined to achieve a system having a tag that absorbs infrared light in particular portions (the black portions of the pattern encoded in tag 104) and reflects infrared light in other portions (the white portions of the pattern encoded in tag 104), and also reduces near infrared and/or red light that may be introduced by ambient light and that can be sensed by sensors 112. Ambient light refers to light present in the environment in which system 100 is used but that is not generated by display panel 102 (e.g., light from lighting fixtures, sunlight, and so forth). As discussed above, sensors 112 may detect light in wavelengths other than infrared wavelengths, and the interference that ambient light in near infrared or red wavelengths may introduce (e.g., causing a white portion to be sensed as black and/or a black portion to be sensed as white) is reduced.

The base mirror component is a visibly transparent mirror that reflects particular wavelengths of light. Light of these particular wavelengths received at the bottom 122 of tag 104 is reflected back towards display panel 102, and light of these particular wavelengths received at the top 124 of tag 104 is reflected back towards its source (and thus away from) display panel 102. The infrared light reflected from base mirror component towards display panel 102 is sensed by sensors 112, providing the white portion of the pattern included in tag 104.

The base mirror component can be implemented in different manners. In one or more embodiments, the base mirror component is a dichroic layer or dielectric optical stack that reflects particular wavelengths of light, including reflecting at least infrared wavelengths. This dichroic layer or dielectric stack can be a coating of any number of layers on various substrates, such as a polymer substrate (e.g., polyethylene terephthalate (PET) film). The polymer substrate can optionally be a color-compounded polymer (e.g., a polymer sheet) that absorbs or reflects particular wavelengths of light. For example, the polymer substrate can include one or more dyes that absorb or reflect particular wavelengths of light. Alternatively, rather than a dichroic optical thin film dielectric stack, the mirror may be formed as a ¼-wave multilayer stack of polymer optical thin film (e.g., analogous to technology used to fabricate ESR (Enhanced Specular Reflector) film available from 3M of St. Paul, Minn.), but designed to have a response so as to reflect infrared light and transmit visible light, such as a polymer-based multilayer optical film IR reflector.

In one or more embodiments, the base mirror component reflects infrared wavelengths but does not reflect other wavelengths that can be sensed by sensors 112. Alternatively, the base mirror component may reflect both infrared wavelengths and near infrared wavelengths, but not reflect other wavelengths that can be sensed by sensors 112. Alternatively, the base mirror component may reflect infrared wavelengths, near infrared wavelengths, and red wavelengths, but not reflect other wavelengths that can be sensed by sensors 112. Alternatively, the base mirror component may reflect a portion of infrared wavelengths, a portion of near infrared wavelengths, and/or a portion of red wavelengths, but not reflect other wavelengths that can be sensed by sensors 112. The base mirror component may or may not reflect other wavelengths of light that cannot be sensed by sensors 112, although does not otherwise reflect visible light (except as discussed herein) to maintain the transparent nature of tag 104.

The matrix component is a dye, ink, or other material that absorbs particular wavelengths of light. The matrix component absorbs infrared light in certain locations (based on the pattern), preventing the infrared light from being reflected back towards and sensed by sensors 112, and providing the black portion of the pattern included in tag 104. The matrix component can be implemented in different manners. In one or more embodiments, the matrix component is a dye or ink that is printed on or otherwise affixed to the base mirror component, and that absorbs particular wavelengths of light including absorbing at least infrared wavelengths. The base mirror component can be implemented as a substrate with a dichroic layer or dielectric optical stack coating on one side (e.g., a top of the substrate, which is the side of the substrate closer to the top 124 of tag 104), and the matrix component being printed on the opposite or opposing side of the substrate (e.g., the bottom of the substrate, which is the side of the substrate closer to the bottom 122 of tag 104). The matrix component can alternatively or additionally be printed directly onto the coated side of the substrate as well (e.g., if both coating and printing is on the bottom side of the substrate, then having printing on the very bottom (below the coating)).

In one or more embodiments, the matrix component absorbs infrared wavelengths but does not absorb other wavelengths that can be sensed by sensors 112. Alternatively, the matrix component may absorb both infrared wavelengths and near infrared wavelengths, but not absorb other wavelengths that can be sensed by sensors 112. Alternatively, the matrix component may absorb infrared wavelengths, near infrared wavelengths, and red wavelengths, but not absorb other wavelengths that can be sensed by sensors 112. Alternatively, the matrix component may absorb a portion of infrared wavelengths, a portion of near infrared wavelengths, and/or a portion of red wavelengths, but not absorb other wavelengths that can be sensed by sensors 112. The matrix component may or may not absorb other wavelengths of light that cannot be sensed by sensors 112, although does not otherwise absorb visible light (except as discussed herein) to maintain the transparent nature of tag 104.

The filter component rejects particular wavelengths of light by absorbing, reflecting, or otherwise preventing those particular wavelengths of light from passing through the filter component (and thus from being sensed by sensors 112). The filter component rejects at least particular wavelengths of light that are not absorbed by the matrix component and that can be sensed by sensors 112. For example, the base mirror component may allow near infrared and/or red light that can be sensed by sensors 112 through. The filter component can absorb this infrared and/or red light, thereby reducing the infrared and/or red light in ambient light that may pass through tag 104 and be sensed by sensors 112. By way of another example, the base mirror component may allow some infrared light through (e.g., the base mirror component may reflect 70-80% of the infrared light, but allow 20-30% of the infrared light through). The filter component can absorb this infrared light, facilitating the absorbing of infrared light by the matrix component (as ambient infrared light is being absorbed by both the filter component and the matrix component).

The filter component is a dye, ink, compounded polymer, or other material that rejects particular wavelengths of light, typically including at least red or near infrared wavelengths that can be sensed by sensors 112. The filter component can be implemented in different manners. In one or more embodiments, the filter component is a dye or ink that is printed on or otherwise affixed to the base mirror component, or included in a polymer sheet (e.g., PET film). The filter component can be situated on the same side of the polymer substrate as a dichroic layer or dielectric optical stack coating of the base mirror component (e.g., on top of the dichroic layer or dielectric optical stack coating). In other embodiments, the filter component is a dye or ink that is printed on or otherwise affixed to a layer of display panel 102. In other embodiments, the filter component is a dye or ink included in the base mirror component (e.g., a compounded dye included in a polymer substrate of the base mirror component).

In one or more embodiments, the filter component rejects both near infrared wavelengths and red wavelengths but does not reject other wavelengths that can be sensed by sensors 112. Alternatively, the filter component may reject red wavelengths, but not reject other wavelengths that can be sensed by sensors 112. Alternatively, the filter component may reject near infrared wavelengths, but not reject other wavelengths that can be sensed by sensors 112. Alternatively, the filter component may reject infrared wavelengths, near infrared wavelengths, and red wavelengths, but not reject other wavelengths that can be sensed by sensors 112. Alternatively, the filter component may reject a portion of infrared wavelengths, a portion of near infrared wavelengths, and/or a portion of red wavelengths, but not reject other wavelengths that can be sensed by sensors 112. Alternatively, no filter component may be included. The filter component may or may not reject other wavelengths of light that cannot be sensed by sensors 112, although does not otherwise reject visible light (except as discussed herein) to maintain the transparent nature of tag 104.

Different ones of the base mirror, matrix, and filter components are discussed as absorbing, reflecting, etc. infrared, near infrared, and/or red wavelengths of light. Although infrared, near infrared, and red wavelengths are discussed as examples, it should be noted that different components can absorb, reflect, etc. various other wavelengths, portions of these wavelengths, and/or combinations of these wavelengths. For example, the base mirror component may reflect a portion of the near infrared light (e.g., approximately 680 nm to 750 nm), and the filter component may absorb or otherwise reject another portion of the near infrared light (e.g., approximately 740 nm to 810 nm).

The different components can be implemented in different layers of tag 104 (and optionally display panel 102). Each component can be implemented in its own layer, or alternatively multiple components may be implemented in a single layer.

Various discussions are included herein of different dyes and inks Any of a variety of dyes and/or inks can be used with the techniques discussed herein. For example, a polymer sheet compounded with Epolin E4037, E9151 and E6698 dyes (available from Epolin, Inc. of Newark, N.J.) may be designed to absorb or otherwise reject red light and near infrared light, while use of only E4037 and E9151 dyes may provide absorption or rejection of near infrared light but exhibit substantially neutral color (e.g., appears slightly 'gray' from attenuation, but when over the display panel just attenuates visible light slightly while filtering the stated near infrared light). By way of another example, for printing a 3-dye ink-based combination of Epolin E4037, E5548 (or Spectre S300) and E6818 dyes may be designed at appropriate absorbance ratios to absorb or otherwise reject near infrared light and have substantially no perceptible color and slight attenuation. An ink base for such a combination may be, for example, the Nazdar 84200 halogen free ink base series ink (available from Nazdar Company of Shawnee, Kans.).

Figure 3:
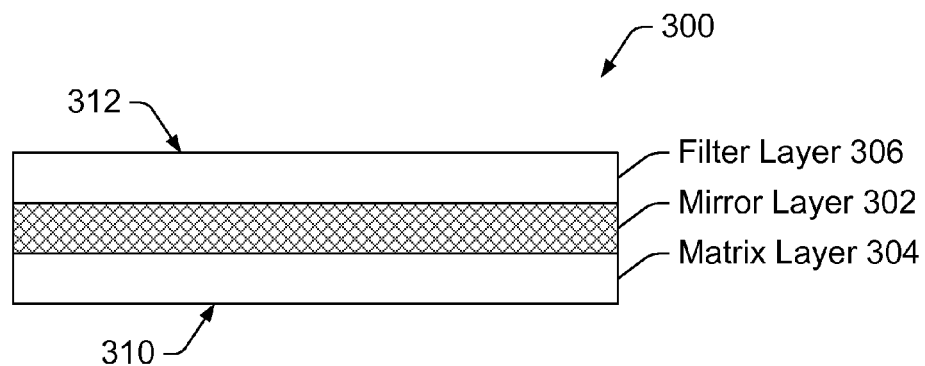
FIG. 3 is a cross section view of an example tag in accordance with one or more embodiments.

FIG. 3 is a cross section view of an example tag 300 in accordance with one or more embodiments. Tag 300 can be, for example, a tag 104 of FIG. 1. Tag 300 includes three separate layers: a mirror layer 302 that implements the base mirror component, a matrix layer 304 that implements the matrix component, and a filter layer 306 that implements the filter component. As illustrated, filter layer 306 is situated on one side of (on top of or above) matrix mirror layer 302, and matrix layer 304 is situated on the opposite side of (beneath or below) mirror layer 302.

Tag 300 is placed close to or touching a display panel (e.g., display panel 102 of FIG. 1), resulting in the bottom 310 of tag 300 being close to or touching the display panel. Some of the infrared light emitted by the display panel can be absorbed by portions of matrix layer 304, and some of the infrared light emitted by the display panel can be reflected back to the display panel by mirror layer 302 (the infrared light which is not absorbed by portions of matrix layer 304). Filter layer 306 rejects particular wavelengths, reducing interference from ambient light coming from above tag 300 (e.g., reaching tag 300 at the top 312 of tag 300).

Filter layer 306 is typically a blanket filter, which refers to all portions of the filter layer 306 having approximately the same light absorption and reflection characteristics. Filter layer 306 thus blankets or covers the layers 302 and 304 below filter layer 306. Alternatively, filter layer 306 can be a patterned layer, which refers to different portions of the filter layer 306 having different light absorption and reflection characteristics. For example, filter layer 306 can be patterned to reject particular wavelengths only in portions that correspond to the portions of matrix layer 304 that include dye or ink that absorb particular wavelengths. The portions of filter layer 306 that correspond to portions of matrix layer 304 refer to those portions of filter layer 306 that are above those portions of matrix layer 304 (e.g., those portions of filter layer 306 that would be above portions 202 illustrated in FIG. 2).

Figure 4:
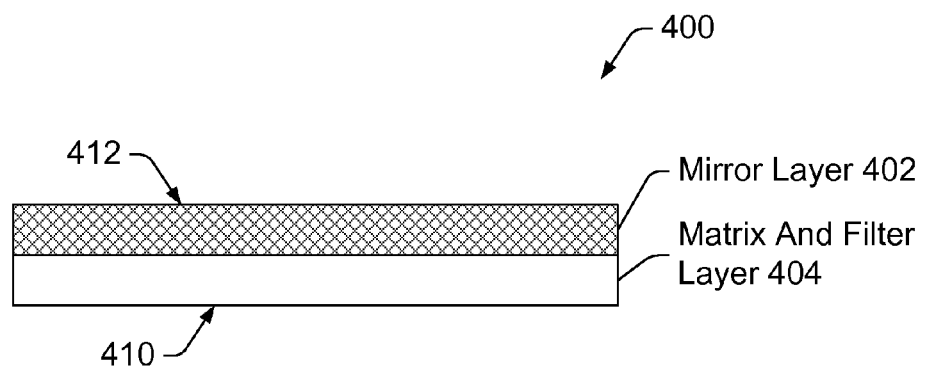
FIG. 4 is a cross section view of another example tag in accordance with one or more embodiments.

FIG. 4 is a cross section view of an example tag 400 in accordance with one or more embodiments. Tag 400 can be, for example, a tag 104 of FIG. 1. Tag 400 includes two separate layers: a mirror layer 402 that implements the base mirror component, and a matrix and filter layer 404 that implements both the matrix component and the filter component. As illustrated, mirror layer 402 is above or on top of matrix and filter layer 404.

Tag 400 is placed close to or touching a display panel (e.g., display panel 102 of FIG. 1), resulting in the bottom 410 of tag 400 being close to or touching the display panel. The dye, ink, or other material used to implement the matrix component is combined with the dye, ink, or other material used to implement the filter component. Thus, some of the infrared light emitted by the display panel can be absorbed by portions of matrix layer 404, and some of the infrared light emitted by the display panel can be reflected back to the display panel by mirror layer 402 (the infrared light which is not absorbed by portions of matrix layer 404). Matrix and filter layer 404 also rejects particular wavelengths, reducing interference from ambient light coming from above tag 400 (e.g., reaching tag 400 at the top 412 of tag 400).

Figure 5:
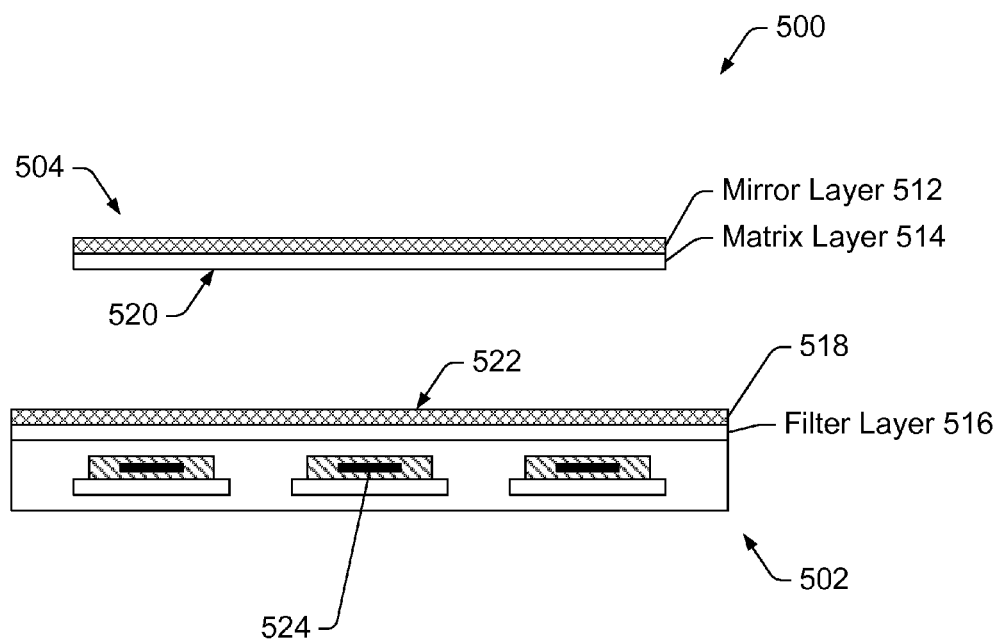
FIG. 5 is a cross section view of an example system in accordance with one or more embodiments.

FIG. 5 is a cross section view of an example system 500 in accordance with one or more embodiments. System 500 includes a display panel 502 and a tag 504. Display panel 502 can be, for example, a display panel 102 of FIG. 1, and tag 504 can be, for example, a tag 104 of FIG. 1. Tag 504 includes two separate layers: a mirror layer 512 that implements the base mirror component, and a matrix layer 514 that implements the matrix component. As illustrated, mirror layer 512 is above or on top of matrix and filter layer 514. Tag 504 can optionally include a filter layer (not shown) that implements at least part of the filter component. This filter layer can be above mirror layer 512 (analogous to tag 300 of FIG. 3), or included as part of matrix layer 514 (analogous to tag 400 of FIG. 4).

Display panel 502 includes a filter layer 516, which implements at least part of the filter component. Filter layer 516 is illustrated as being below a cover panel 518, although filter layer 516 can alternatively be located in other parts of display panel 502 (e.g., above cover panel 518).

Tag 504 is placed close to or touching display panel 502, resulting in the bottom 520 of tag 504 being close to or touching the top 522 of display panel 502. Some of the infrared light emitted by display panel 502 can be absorbed by portions of matrix layer 514, and some of the infrared light emitted by display panel 502 can be reflected back to display panel 502 by mirror layer 512 (the infrared light which is not absorbed by portions of matrix layer 514). Filter layer 516 rejects particular wavelengths, reducing interference from ambient light coming from above display panel 502 (e.g., reaching display panel at the top 522 of display panel 502), including reducing interference from ambient light coming from above tag 504.

Filter layer 516 is typically a blanket filter, blanketing or covering the layers of display panel 502 below filter layer 516. Alternatively, filter layer 516 can be a patterned layer. For example, filter layer 516 can be patterned to reject particular wavelengths only in portions that correspond to the portions of display panel 502 above sensor elements 524 (analogous to sensor elements 112 of FIG. 1).

Figure 6:
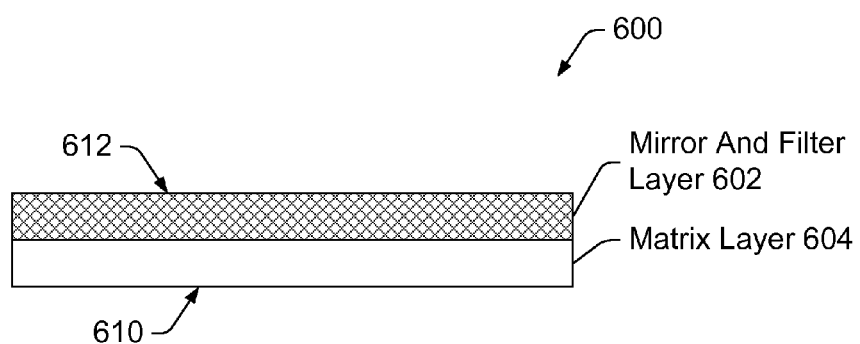
FIG. 6 is a cross section view of another example tag in accordance with one or more embodiments.

FIG. 6 is a cross section view of an example tag 600 in accordance with one or more embodiments. Tag 600 can be, for example, a tag 104 of FIG. 1. Tag 600 includes two separate layers: a mirror and filter layer 602 that implements the base mirror component and the filter component, and a matrix layer 604 that implements the matrix component. As illustrated, mirror and filter layer 602 is above or on top of matrix layer 604.

Tag 600 is placed close to or touching a display panel (e.g., display panel 102 of FIG. 1), resulting in the bottom 610 of tag 600 being close to or touching the display panel. The dye, ink, or other material used to implement the filter component is combined with the material used to implement the mirror component, such as being mixed or otherwise combined with other materials when generating a polymer substrate of the base mirror component. The reflective part of the base mirror component (e.g., the dichroic layer or dielectric stack) is implemented on the bottom of mirror and filter layer 602, so the part of mirror and filter layer 602 that reflects infrared light is situated between matrix layer 604 and the part of mirror and filter layer 602 that implements the filter component. Thus, some of the infrared light emitted by the display panel can be absorbed by portions of matrix layer 604, and some of the infrared light emitted by the display panel can be reflected back to the display panel by mirror and filter layer 602 (the infrared light which is not absorbed by portions of matrix layer 604 is reflected back by part of the base mirror component, such as by the dichroic layer or dielectric stack). Mirror and filter layer 602 also rejects particular wavelengths, reducing interference from ambient light coming from above tag 600 (e.g., reaching tag 600 at the top 612 of tag 600).

Various layers are illustrated in the tag examples of FIGS. 3-6. However, it should be noted that any number of additional layers can be included in the tags discussed herein. For example, one or more protective layers can be included to protect the filter layer, mirror layer, and/or matrix layer from elements external to the tag (e.g., ultraviolet light, scratches, etc.), such as a clear protective layer on the top and/or bottom of the tag. By way of another example, an adhesive layer can be included (e.g., on top of the filter layer or mirror layer), allowing the tag to be affixed to an object, or between layers for cases where the tag stack may have more than one substrate layer.

Returning to FIG. 1, as discussed above the mirror, matrix, and optionally filter components are combined to achieve a system having a tag that absorbs infrared light in particular portions (the black portions of the pattern in tag 104) and reflects infrared light in other portions (the white portions of the pattern in tag 104), and also reduces near infrared and/or red light that may be introduced by ambient light that can be sensed by sensors 112. These components can be combined in a variety of different matters to achieve such a system. Multiple different example combinations are discussed in the following.

In the discussions herein, reference is made to various components reflecting, absorbing, rejecting, and so forth particular wavelengths of light. It is to be appreciated that these discussions include reflecting, absorbing, rejecting, etc. all light of particular wavelengths, or at least a threshold amount of light of particular wavelengths. This threshold amount may be, for example, 50 percent, 80 percent, and so forth. Thus, a particular component reflecting, absorbing, rejecting, etc. light of a particular wavelength may reflect, absorb, reject, etc. most light of that particular wavelength but not all light of that particular wavelength.

It should be noted that, in some of the discussions herein, reference is made to particular components absorbing or otherwise rejecting red light. In situations where a component absorbs or otherwise rejects red light, tag 104 has a particular tint. If the component that absorbs or otherwise rejects the red light is the base mirror component and/or a blanket filter component, then all (or almost all) of tag 104 has the particular tint. However, if the component that absorbs or otherwise rejects the red light is the matrix component, then the portions of the tag that absorb infrared light (the black portions of the pattern) has the particular tint but other portions (the white portions of the pattern) do not have the tint. For example, the tag may have a cyan colored tint, although is still transparent to the user. Furthermore, components that absorb or otherwise reject red light can optionally be designed to absorb or otherwise reject additional wavelengths of light (e.g., some orange light, some yellow light, some green light, etc.). By selecting which light wavelengths these components absorb or otherwise reject, tags having different tints can be generated. For example, tags having a green tint, a blue tint, and so forth can be designed.

Example Combination 1

In one or more embodiments, the components operate as follows: the base mirror component reflects infrared wavelengths but does not reflect other wavelengths that can be sensed by sensors 112; the matrix component absorbs infrared wavelengths in particular portions (based on the pattern) but does not absorb other wavelengths that can be sensed by sensors 112; and the filter component rejects both near infrared wavelengths and red wavelengths but does not reject other wavelengths that can be sensed by sensors 112. In such embodiments, infrared light is reflected by the base mirror component in some portions and absorbed by the matrix component in other portions to present the pattern in tag 104 to the display panel. Near infrared and red wavelengths of light are rejected by the filter component, reducing the near infrared and red wavelengths of ambient light that can pass through tag 104 and be sensed by sensors 112.

Alternatively, the filter component can also reject infrared wavelengths. By rejecting infrared wavelengths, the filter component facilitates absorption of infrared light by the matrix component because ambient infrared light is being absorbed by both the filter component and the matrix component. This combination may improve black level in the identified image of the tag (e.g., in cases where the base mirror component exhibits partial reflectivity).

Alternatively, the matrix component may absorb both infrared wavelengths and near infrared wavelengths in particular portions (based on the pattern), but not absorb other wavelengths that can be sensed by sensors 112. By absorbing both infrared wavelengths and near infrared wavelengths in particular portions (based on the pattern), the matrix component facilitates rejection in those particular portions of both infrared wavelengths and near infrared wavelengths of ambient light that can pass through tag 104 and be sensed by sensors 112. In other alternatives, the matrix component may absorb infrared wavelengths, near infrared wavelengths, and red wavelengths in particular portions (based on the pattern), but not absorb other wavelengths that can be sensed by sensors 112. By absorbing infrared wavelengths, near infrared wavelengths, and red wavelengths, the matrix component facilitates rejection in those particular portions of infrared wavelengths, near infrared wavelengths, and red wavelengths of ambient light that can pass through tag 104 and be sensed by sensors 112.

Example Combination 2

In one or more embodiments, the components operate as follows: the base mirror component reflects both infrared wavelengths and near infrared wavelengths but does not reflect other wavelengths that can be sensed by sensors 112; the matrix component absorbs infrared wavelengths in particular portions (based on the pattern) but does not absorb other wavelengths that can be sensed by sensors 112; and the filter component rejects red wavelengths but does not reject other wavelengths that can be sensed by sensors 112. In such embodiments, infrared light is reflected by the base mirror component in some portions and absorbed by the matrix component in other portions to present the pattern in tag 104 to the display panel. Near infrared wavelengths of light are reflected by the base mirror component, reducing the near infrared wavelengths of ambient light that can pass through tag 104 and be sensed by sensors 112. Red wavelengths of light are rejected by the filter component, reducing the red wavelengths of ambient light that can pass through tag 104 and be sensed by sensors 112.

Alternatively, the filter component can also reject near infrared and/or infrared wavelengths. By rejecting infrared wavelengths, the filter component facilitates absorption of infrared light by the matrix component because ambient infrared light is being absorbed by both the filter component and the matrix component. By rejecting near infrared wavelengths, the filter component reduces the near infrared wavelengths of ambient light that can pass through tag 104 and be sensed by sensors 112.

Alternatively, the matrix component may absorb both infrared wavelengths and near infrared wavelengths in particular portions (based on the pattern), but not absorb other wavelengths that can be sensed by sensors 112. By absorbing both infrared wavelengths and near infrared wavelengths in particular portions (based on the pattern), the matrix component facilitates rejection in those particular portions of both infrared wavelengths and near infrared wavelengths of ambient light that can pass through tag 104 and be sensed by sensors 112. In other alternatives, the matrix component may absorb infrared wavelengths, near infrared wavelengths, and red wavelengths in particular portions (based on the pattern), but not absorb other wavelengths that can be sensed by sensors 112. By absorbing infrared wavelengths, near infrared wavelengths, and red wavelengths, the matrix component facilitates rejection in those particular portions of infrared wavelengths, near infrared wavelengths, and red wavelengths of ambient light that can pass through tag 104 and be sensed by sensors 112.

Example Combination 3

In one or more embodiments, the components operate as follows: the base mirror component reflects infrared wavelengths, near infrared wavelengths, and red wavelengths, but does not reflect other wavelengths that can be sensed by sensors 112; the matrix component absorbs infrared wavelengths in particular portions (based on the pattern) but does not absorb other wavelengths that can be sensed by sensors 112; and no filter component is included. In such embodiments, infrared light is reflected by the base mirror component in some portions and absorbed by the matrix component in other portions to present the pattern in tag 104 to the display panel. Near infrared and red wavelengths of light are also reflected by the base mirror component, so no filter component absorbing the near infrared and/or red light need be used.

Alternatively, a filter component that rejects infrared wavelengths can be included in tag 104. By rejecting infrared wavelengths, the filter component facilitates absorption of infrared light by the matrix component because ambient infrared light is being absorbed by both the filter component and the matrix component.

Alternatively, the matrix component may absorb both infrared wavelengths and near infrared wavelengths in particular portions (based on the pattern), but not absorb other wavelengths that can be sensed by sensors 112. By absorbing both infrared wavelengths and near infrared wavelengths in particular portions (based on the pattern), the matrix component facilitates rejection in those particular portions of both infrared wavelengths and near infrared wavelengths of ambient light that can pass through tag 104 and be sensed by sensors 112. In other alternatives, the matrix component may absorb infrared wavelengths, near infrared wavelengths, and red wavelengths in particular portions (based on the pattern), but not absorb other wavelengths that can be sensed by sensors 112. By absorbing infrared wavelengths, near infrared wavelengths, and red wavelengths, the matrix component facilitates rejection in those particular portions of infrared wavelengths, near infrared wavelengths, and red wavelengths of ambient light that can pass through tag 104 and be sensed by sensors 112.

Example Combination 4

In one or more embodiments, the components operate as follows: the base mirror component reflects infrared wavelengths but does not reflect other wavelengths that can be sensed by sensors 112; the matrix component absorbs infrared wavelengths in particular portions (based on the pattern) but does not absorb other wavelengths that can be sensed by sensors 112; and the filter component rejects near infrared wavelengths, but does not reject other wavelengths that can be sensed by sensors 112. In such embodiments, infrared light is reflected by the base mirror component in some portions and absorbed by the matrix component in other portions to present the pattern in tag 104 to the display panel. Near infrared wavelengths of light are rejected by the filter component, reducing the near infrared wavelengths of ambient light that can pass through tag 104 and be sensed by sensors 112.

Alternatively, the matrix component may absorb both infrared wavelengths and near infrared wavelengths in particular portions (based on the pattern), but not absorb other wavelengths that can be sensed by sensors 112. By absorbing both infrared wavelengths and near infrared wavelengths in particular portions (based on the pattern), the matrix component facilitates rejection in those particular portions of both infrared wavelengths and near infrared wavelengths of ambient light that can pass through tag 104 and be sensed by sensors 112. In other alternatives, the matrix component may absorb infrared wavelengths, near infrared wavelengths, and red wavelengths in particular portions (based on the pattern), but not absorb other wavelengths that can be sensed by sensors 112. By absorbing infrared wavelengths, near infrared wavelengths, and red wavelengths, the matrix component facilitates rejection in those particular portions of infrared wavelengths, near infrared wavelengths, and red wavelengths of ambient light that can pass through tag 104 and be sensed by sensors 112.

Example Combination 5

In one or more embodiments, the components operate as follows: the base mirror component reflects infrared wavelengths but does not reflect other wavelengths that can be sensed by sensors 112; the matrix component absorbs infrared wavelengths in particular portions (based on the pattern) but does not absorb other wavelengths that can be sensed by sensors 112; and the filter component rejects near infrared wavelengths, but does not reject other wavelengths that can be sensed by sensors 112. In such embodiments, the filter component is implemented in the display panel rather than tag 104. Infrared light is reflected by the base mirror component in some portions and absorbed by the matrix component in other portions to present the pattern in tag 104 to the display panel. Near infrared wavelengths of light are rejected by the filter component, reducing the near infrared wavelengths of ambient light as well as near infrared wavelengths of light produced by display panel 102 and reflected by tag 104, that are passed through display panel 102 and can be sensed by sensors 112.

Alternatively, the filter component can also reject infrared wavelengths. By rejecting infrared wavelengths, the filter component facilitates absorption of infrared light by the matrix component because ambient infrared light is being absorbed by both the filter component and the matrix component.

Alternatively, part of the filter component can also be included in the tag. The part of the filter component included in the tag rejects red wavelengths, but does not reject other wavelengths. By rejecting red wavelengths, the part of the filter component included in the tag reduces the red wavelengths of ambient light that can pass through tag 104 and be sensed by sensors 112.

Alternatively, the matrix component may absorb both infrared wavelengths and near infrared wavelengths in particular portions (based on the pattern), but not absorb other wavelengths that can be sensed by sensors 112. By absorbing both infrared wavelengths and near infrared wavelengths in particular portions (based on the pattern), the matrix component facilitates rejection in those particular portions of both infrared wavelengths and near infrared wavelengths of ambient light that can pass through tag 104 and be sensed by sensors 112. In other alternatives, the matrix component may absorb infrared wavelengths, near infrared wavelengths, and red wavelengths in particular portions (based on the pattern), but not absorb other wavelengths that can be sensed by sensors 112. By absorbing infrared wavelengths, near infrared wavelengths, and red wavelengths, the matrix component facilitates rejection in those particular portions of infrared wavelengths, near infrared wavelengths, and red wavelengths of ambient light that can pass through tag 104 and be sensed by sensors 112.

Figure 7:
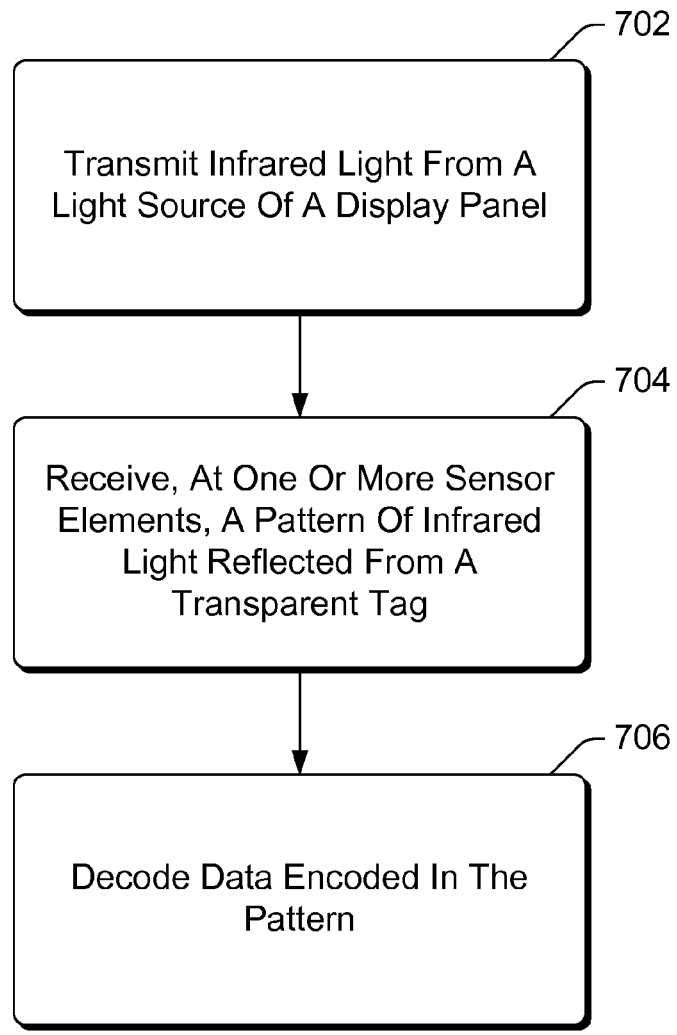
FIG. 7 is a flowchart illustrating an example process for using a transparent tag in accordance with one or more embodiments.

FIG. 7 is a flowchart illustrating an example process 700 for using a transparent tag in accordance with one or more embodiments. Process 700 can be carried out at least in part by a display panel, such as display panel 102 of FIG. 1 or display panel 502 of FIG. 5, and can be implemented in software, firmware, hardware, or combinations thereof. Process 700 is shown as a set of acts and is not limited to the order shown for performing the operations of the various acts. Process 700 is an example process for using a transparent tag; additional discussions of using a transparent tag are included herein with reference to different figures.

In process 700, infrared light is transmitted from a light source through a display panel (act 702). The display panel can transmit infrared light in various manners, as discussed above.

A pattern of infrared light reflected from a transparent tag touching or close to (e.g., within a threshold distance) of the display panel is received at one or more sensor elements (act 704). These one or more sensor elements can be included in pixels of the display panel of the display system, as discussed above.

Data encoded in the pattern is decoded (act 706). Data can be encoded in the pattern in various manners, as discussed above. Alternatively, rather than decoding the data in the pattern, the display panel can provide the pattern to one or more other components or devices to decode the data encoded in the pattern.

Figure 8:
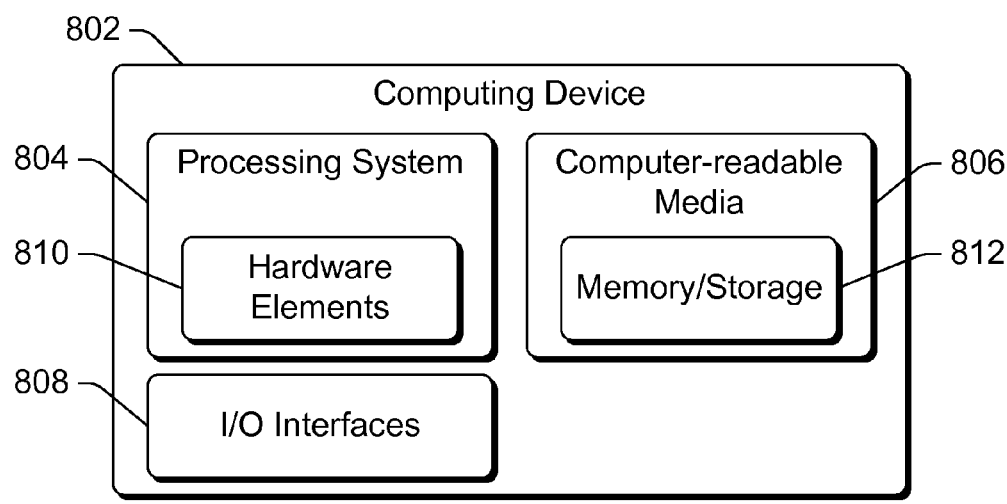
FIG. 8 illustrates an example computing device that is representative of one or more computing systems and/or devices that may implement the various techniques described herein.

FIG. 8 illustrates an example computing device 802 that is representative of one or more computing systems and/or devices that may implement the various techniques described herein. Computing device 802 can be any of a variety of different types of devices, such as a desktop computer, a server computer, a laptop or netbook computer, a tablet or notepad computer, a mobile station, an entertainment appliance, a set-top box communicatively coupled to a display device, a television or other display device, a cellular or other wireless phone, a game console, an automotive computer, and so forth. Computing device 802 can, for example, implement a display panel as discussed herein, control a manufacturing system building a transparent tag as discussed herein, and so forth.

The example computing device 802 as illustrated includes a processing system 804, one or more computer-readable media 806, and one or more I/O Interfaces 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware elements 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 806 is illustrated as including memory/storage 812. The memory/storage 812 represents memory/storage capacity associated with one or more computer-readable media. The memory/storage 812 may include volatile media (such as random access memory (RAM)) and/or nonvolatile media (such as read only memory (ROM), Flash memory, optical disks, magnetic disks, and so forth). The memory/storage 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display panel or other display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module" and "functionality" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" refers to media and/or devices that enable persistent storage of information and/or storage that is not transitory, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of modules as an module that is executable by the computing device 802 as software may be achieved at least partially in hardware, e.g., through use of computer-readable storage media and/or hardware elements 810 of the processing system. The instructions and/or functions may be executable/operable by one or more articles of manufacture (for example, one or more computing devices 802 and/or processing systems 804) to implement techniques, modules, and examples described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A transparent tag comprising:
   a first layer implementing a base mirror component that reflects at least infrared light wavelengths;
   a second layer implementing a matrix component, the second layer being situated on one side of the first layer and having one or more portions that absorb at least infrared wavelengths of light, the portions that absorb infrared wavelengths of light and other portions through which infrared wavelengths of light are reflected encoding data; and
   a third layer implementing a filter component that absorbs one or more particular wavelengths of light, the third layer being situated on an additional side of the first layer that is opposite the one side.

2. A transparent tag as recited in claim 1, the transparent tag comprising a tag having no color visible to the human eye.

3. A transparent tag as recited in claim 1, the portions that absorb at least infrared wavelengths of light comprising portions that absorb at least infrared wavelengths of light received from a sensor-in-pixel display panel, and the base mirror component comprising a base mirror component that reflects back towards the sensor-in-pixel display panel at least infrared light wavelengths from the sensor-in-pixel panel.

4. A transparent tag as recited in claim 3, the one or more particular wavelengths of light comprising red light wavelengths, and the sensor-in-pixel implementing a filter that absorbs at least near infrared light wavelengths.

5. A transparent tag as recited in claim 1, the one or more particular wavelengths of light comprising red light wavelengths or near infrared light wavelengths.

6. A transparent tag as recited in claim 5, the one or more particular wavelengths of light further comprising both red light wavelengths and near infrared light wavelengths.

7. A transparent tag as recited in claim 6, the first layer comprising a dichroic coated substrate, and the third layer comprising a dye or ink on the one side or on the additional side of the first layer.

8. A transparent tag as recited in claim 6, the one or more particular wavelengths of light further comprising infrared light wavelengths.

9. A transparent tag as recited in claim 1, the first layer comprising a polymer substrate for a dielectric optical stack on one side of the polymer substrate, the polymer substrate including one or more dyes that absorb one or more wavelengths of light, and the portions of the second layer that absorb at least infrared wavelengths of light comprising infrared light wavelength absorbing ink printed on an additional side of the polymer substrate that is opposite the dielectric optical stack.

10. A transparent tag as recited in claim 1, wherein the base mirror component reflects at least both infrared light wavelengths and near infrared light wavelengths, and the one or more particular wavelengths of light comprise red light wavelengths.

11. A transparent tag as recited in claim 1, wherein the base mirror component reflects at least infrared light wavelengths, near infrared light wavelengths, and red light wavelengths.

12. A transparent tag comprising:
a base mirror component implemented in a first layer that reflects at least infrared light wavelengths, the first layer comprising a polymer substrate for a dielectric optical stack on one side of the polymer substrate, and the polymer substrate including one or more dyes that absorb at least near infrared wavelengths of light and red wavelengths of light;
a matrix component implemented in a second layer, the second layer comprising ink printed on an additional side of the polymer substrate that is opposite the dielectric optical stack and having one or more portions that absorb at least infrared wavelengths of light, the portions that absorb infrared wavelengths of light and other portions through which infrared wavelengths of light are reflected encoding data; and
a filter component implemented in the first layer or in a third layer that is situated on the one side of the polymer substrate, the filter component being a blanket filter that absorbs at least near infrared wavelengths of light.

13. A transparent tag comprising:
a first layer;
a second layer implementing a matrix component, the second layer being situated on one side of the first layer and having one or more portions that absorb at least infrared wavelengths of light, the portions that absorb infrared wavelengths of light and other portions through which infrared wavelengths of light are reflected encoding data; and
a third layer implementing a filter component that absorbs one or more particular wavelengths of light, the third layer being situated on an additional side of the first layer that is opposite the one side.

14. A transparent tag as recited in claim 13, the transparent tag comprising a tag having no color visible to the human eye.

15. A transparent tag as recited in claim 13, the one or more particular wavelengths of light comprising red light wavelengths or near infrared light wavelengths.

16. A transparent tag as recited in claim 15, the one or more particular wavelengths of light further comprising both red light wavelengths and near infrared light wavelengths.

17. A transparent tag as recited in claim 16, the first layer comprising a dichroic coated substrate, and the third layer comprising a dye or ink on the one side or on the additional side of the first layer.

18. A transparent tag as recited in claim 16, the one or more particular wavelengths of light further comprising infrared light wavelengths.

19. A transparent tag as recited in claim 13, the first layer comprising a polymer substrate for a dielectric optical stack on one side of the polymer substrate, the polymer substrate including one or more dyes that absorb one or more wavelengths of light, and the portions of the second layer that absorb at least infrared wavelengths of light comprising infrared light wavelength absorbing ink printed on an additional side of the polymer substrate that is opposite the dielectric optical stack.

20. A transparent tag as recited in claim 13, the portions that absorb at least infrared wavelengths of light comprising portions that absorb at least infrared wavelengths of light received from a sensor-in-pixel display panel.

* * * * *